United States Patent
Niemelä et al.

(10) Patent No.: US 11,692,914 B2
(45) Date of Patent: Jul. 4, 2023

(54) DILUTING DEVICE FOR AEROSOL MEASUREMENTS

(71) Applicant: Dekati Oy, Kangasala (FI)

(72) Inventors: Ville Niemelä, Kangasala (FI); Leo Holma, Kangasala (FI); Sami Lundahl, Kangasala (FI); Ari Ukkonen, Kangasala (FI)

(73) Assignee: Dekati Oy, Kangasala (FI)

( * ) Notice: Subject to any disclaimer, the term of this patent is extended or adjusted under 35 U.S.C. 154(b) by 196 days.

(21) Appl. No.: 17/431,625

(22) PCT Filed: Feb. 10, 2020

(86) PCT No.: PCT/FI2020/050080
§ 371 (c)(1),
(2) Date: Aug. 17, 2021

(87) PCT Pub. No.: WO2020/169877
PCT Pub. Date: Aug. 27, 2020

(65) Prior Publication Data
US 2022/0163430 A1    May 26, 2022

(30) Foreign Application Priority Data
Feb. 18, 2019   (FI) ..................... 20195122

(51) Int. Cl.
*G01N 1/22* (2006.01)
*G01M 15/10* (2006.01)

(52) U.S. Cl.
CPC ........ *G01N 1/2252* (2013.01); *G01M 15/106* (2013.01); *G01N 2001/2255* (2013.01)

(58) Field of Classification Search
CPC ......... G01N 1/2252; G01N 2001/2255; G01N 2001/2264; G01N 1/2247; G01N 1/38;
(Continued)

(56) References Cited

U.S. PATENT DOCUMENTS 5,058,440 A    10/1991  Graze, Jr.
5,184,501 A     2/1993  Lewis et al.
(Continued)

FOREIGN PATENT DOCUMENTS

EP    0882227 B1    4/2009
FR    2939890 A3    6/2010
(Continued)

OTHER PUBLICATIONS

Finnish Patent and Registration Office, Office Action, Application No. 20195122, dated Jun. 26, 2019, 10 pages.
(Continued)

*Primary Examiner* — Freddie Kirkland, III
(74) *Attorney, Agent, or Firm* — Ziegler IP Law Group

(57) ABSTRACT

The aerosol diluting apparatus includes a first diluting unit to provide a first modified sample flow by combining an aerosol sample flow with a first diluting gas flow, an ejector unit to draw the first modified sample flow from the first diluting unit to the ejector unit and to provide a second modified sample flow by mixing a second dilution gas flow with the first modified sample flow, a control unit, and a control valve, wherein the control unit and the control valve are arranged to adjust flow rate of the second dilution gas flow according to an inlet pressure of the aerosol sample flow, so as to keep the dilution factor of the diluting apparatus substantially independent of the inlet pressure.

16 Claims, 11 Drawing Sheets

Figure 1:
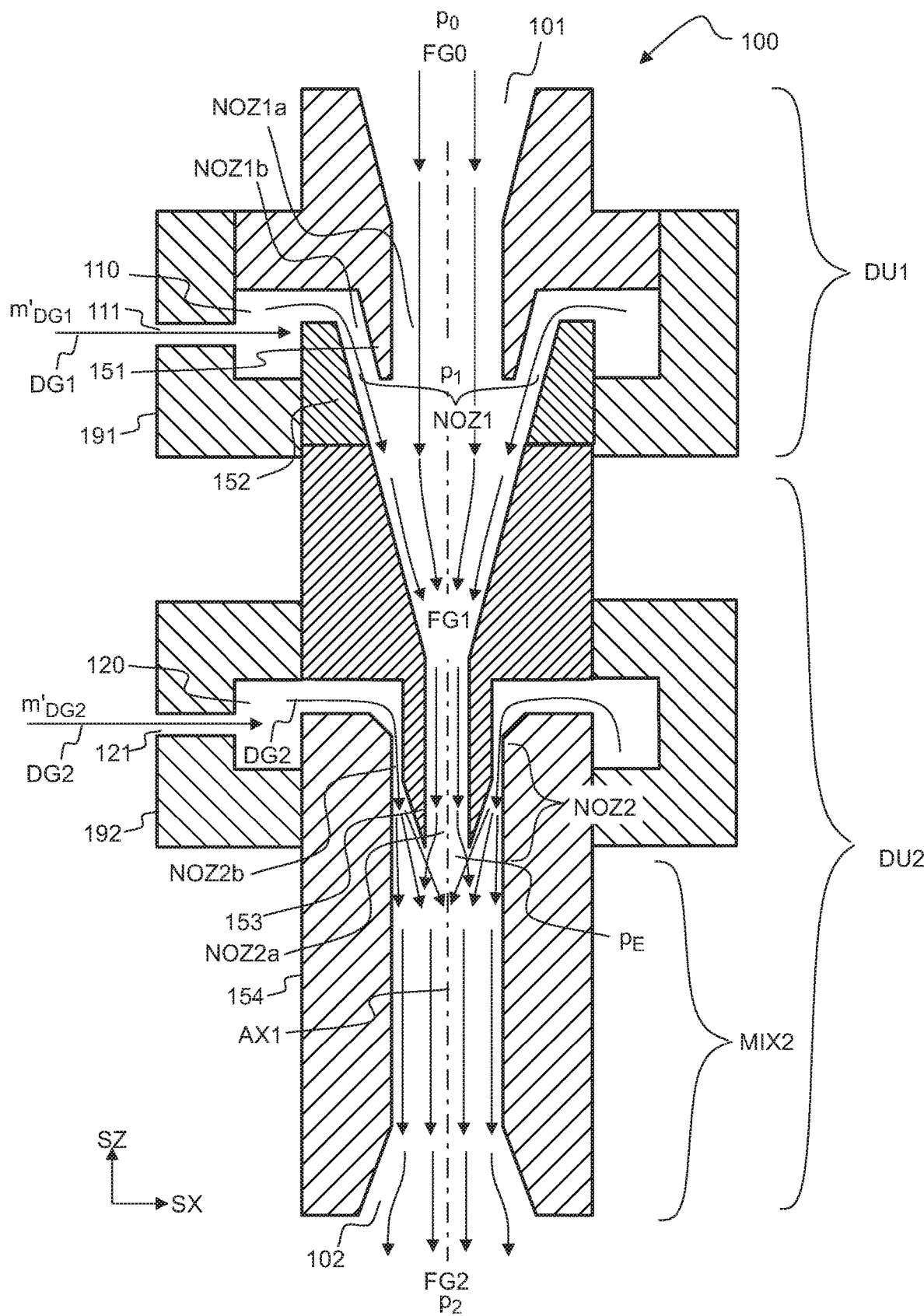

(58) Field of Classification Search
CPC ............. G01N 1/2258; G01N 33/0004; G01N 33/0018; G01N 33/0062; G01N 33/0073; G01M 15/106; B01F 23/10; G05D 7/005; G05D 7/0617; G05D 11/006; G05D 11/138
See application file for complete search history.

(56) References Cited

U.S. PATENT DOCUMENTS

| | | | | |
|---|---|---|---|---|
| 6,211,956 | B1 * | 4/2001 | Nicoli | G01N 15/02 356/337 |
| 6,823,748 | B2 | 11/2004 | Silvis et al. | |
| 7,759,131 | B2 * | 7/2010 | Mikkanen | G01N 1/38 73/863.03 |
| 11,300,487 | B2 * | 4/2022 | Shade | G01N 1/38 |
| 2002/0166390 | A1 | 11/2002 | Graze | |
| 2003/0232449 | A1 | 12/2003 | Mikkanen et al. | |
| 2007/0131038 | A1 | 6/2007 | Wei et al. | |
| 2008/0156116 | A1 | 7/2008 | Graze | |
| 2010/0175459 | A1 | 7/2010 | Knopf et al. | |
| 2015/0153255 | A1 | 6/2015 | Asami et al. | |
| 2016/0273438 | A1 | 9/2016 | Otsuki | |

FOREIGN PATENT DOCUMENTS

| | | |
|---|---|---|
| JP | H05312695 A | 11/1993 |
| JP | 2000028499 A | 1/2000 |
| WO | 2004072603 A2 | 8/2004 |

OTHER PUBLICATIONS

Giechaskiel et al. "Effect of ejector dilutors on measurements of automotive exhaust gas aerosol size distributions" Measurement Science and Technology, IOP, vol. 20, No. 4, Feb. 27, 2009, XP020152661, ISSN: 0957-0233, DOI: 10.1088/0957-0233/20/4/045703, 7 pages.

International Preliminary Report on Patentability, European Patent Office, Application No. PCT/FI2020/050080, dated Feb. 12, 2021, 21 pages.

International Search Report, European Patent Office, Application No. PCT/FI2020/050080, dated May 7, 2020, 5 pages.

Lancaster et al. "Sampling concentrated aerosols diluter design for ultrafine particles", Journal of Aerosol Science, Elsevier, vol. 29, Sep. 1, 1998, XP005884357, ISSN: 0021-8502, 2 pages.

Wong et al. "Characterisation of diesel exhaust particle number and size distributions using mini-dilution tunnel and ejector-diluter measurement techniques" Atmospheric Environment, vol. 37, n. 31, Aug. 27, 2003, ISSN:1352-2310, DOI:10.1016/S1352-2310(P03)00571-5, 12 pages.

Written Opinion of the International Searching Authority, European Patent Office, Application No. PCT/FI2020/050080, dated May 7, 2020, 9 pages.

European Patent Office, Intention to Grant, Application No. 20707706.6, dated Feb. 1, 2022, 7 pages.

* cited by examiner

SECTION A-A

SECTION B-B

805 — Obtain primary aerosol sample flow

810 — Form first modified aerosol sample flow by combining the primary aerosol sample flow with first diluting gas flow in the first diluting unit 815 — Draw the first modified aerosol sample flow from the first diluting unit to the ejector unit by mixing the first modified aerosol sample flow with second diluting gas flow in the ejector unit 820 — Measure inlet pressure 825 — Adjust flow rate of the second diluting gas flow according to the inlet pressure 830 — Provide the second modified aerosol sample flow formed by said mixing 835 — Guide at least a part of the second modified aerosol sample flow to an aerosol measuring instrument 840 — Obtain an aerosol measurement result from the aerosol measuring instrument 845 — Compare the aerosol measurement result with a limit value

Fig. 7

DILUTING DEVICE FOR AEROSOL MEASUREMENTS

FIELD

The aspects of the disclosed embodiments relate to a method and to an apparatus for measuring aerosol particles.

BACKGROUND

Aerosol measurements may be performed e.g. in order to measure particle emissions from an engine of an automobile. An aerosol sample may be diluted e.g. in order to avoid condensation and/or clogging of an aerosol measuring instrument. It is known that an aerosol sample may be diluted by using a porous diluting tunnel.

SUMMARY

Some variations relate to an aerosol diluting apparatus. Some variations relate to an aerosol measuring apparatus, which comprises the diluting apparatus. Some variations relate to a method for diluting an aerosol sample flow. Some variations relate to a method for measuring aerosol particles.

According to an aspect, there is provided an aerosol diluting apparatus comprising:
a first diluting unit to provide a first modified sample flow by combining an aerosol sample flow with a first diluting gas flow,
a control unit, and
a control valve,
wherein the apparatus further comprises an ejector unit to draw the first modified sample flow from the first diluting unit to the ejector unit and to provide a second modified sample flow by mixing a second dilution gas flow with the first modified sample flow, wherein the first diluting unit comprises a gas permeable tunnel element or a nozzle to form a protective annular layer from the first diluting gas flow such that the protective annular layer surrounds a central portion of the first modified sample flow, and
wherein the control unit and the control valve are arranged to adjust flow rate of the first dilution gas flow based on a pressure signal indicative of an inlet pressure of the aerosol sample flow and/or to adjust the flow rate of the second dilution gas flow based on the pressure signal indicative of the inlet pressure, such that the dilution factor of the diluting apparatus is kept substantially constant in a situation where the inlet pressure varies, the dilution factor being the ratio of the mass flow rate of the second modified sample flow to the mass flow rate of the aerosol sample flow, wherein the control unit and the control valve are arranged to maintain the flow rate of the second dilution gas flow higher than a predetermined value such that the minimum pressure in the ejector unit during operation is lower than or equal to 500 mbar, so as to ensure a choked flow condition for the first modified aerosol sample flow in the ejector unit.

According to an aspect, there is provided a method comprising:
using a first diluting unit to provide a first modified sample flow by combining an aerosol sample flow with a first diluting gas flow,
using an ejector unit to draw the first modified sample flow from the first diluting unit to the ejector unit and to provide a second modified sample flow by mixing a second dilution gas flow with the first modified sample flow, and
adjusting flow rate of the first dilution gas flow based on a pressure signal indicative of an inlet pressure of the aerosol sample flow and/or adjusting the flow rate of the second dilution gas flow based on the pressure signal indicative of the inlet pressure, such that the dilution factor of the diluting apparatus is kept substantially constant in a situation where the inlet pressure varies, the dilution factor being the ratio of the mass flow rate of the second modified sample flow to the mass flow rate of the aerosol sample flow, wherein the first diluting unit comprises a gas permeable tunnel element or a nozzle to form a protective annular layer from the first diluting gas flow such that the protective annular layer surrounds a central portion of the first modified sample flow, wherein the flow rate of the second dilution gas flow is maintained higher than a predetermined value such that the minimum pressure in the ejector unit during operation is lower than or equal to 500 mbar, so as to ensure a choked flow condition for the first modified aerosol sample flow in the ejector unit.

The aerosol diluting apparatus may comprise a diluting device and a control unit. The diluting device may be arranged to provide a diluted sample flow by introducing diluting gas flows to an aerosol sample flow. The control unit may be arranged to adjust flow rates of diluting gas flows according to an inlet pressure of the aerosol sample flow.

The diluting device may receive the aerosol sample flow from a sampling point, which has a varying pressure. The aerosol sample flow may be extracted e.g. from an exhaust gas duct of an engine during operation of said engine. The aerosol sample flow may be extracted e.g. from a duct or vessel of an industrial process. The aerosol diluting apparatus may be arranged to operate such that the dilution factor of the diluting device is substantially independent of the inlet pressure of the aerosol sample flow. The control unit may be arranged to adjust flow rates of diluting gas flows according to the varying inlet pressure, so as to keep the dilution factor substantially equal to a selected target value.

The diluting apparatus may provide a constant dilution factor, which is independent of the inlet pressure of the aerosol sample flow. The diluting apparatus may be arranged to operate such that the dilution factor of the diluting apparatus is substantially independent of the inlet pressure of the aerosol sample flow.

The diluting device may be cascade device, which comprises a first diluting unit and a second diluting unit connected in series.

The first diluting unit may receive a primary aerosol sample flow. The first diluting unit may form a first modified aerosol sample flow by combining a first dilution gas flow with the primary aerosol sample flow. The second diluting unit may form a second modified aerosol sample flow by mixing the first modified aerosol sample flow with a second diluting gas flow. The total dilution factor of the diluting device may be equal to the dilution factor of the first diluting unit multiplied by the dilution factor of the second diluting unit.

The second diluting unit may comprise an ejector, which may be arranged to draw an aerosol sample flow to the second diluting unit and to dilute the aerosol sample flow. The second diluting unit may be called e.g. as an ejector unit. The ejector unit may receive a first modified aerosol sample flow from the first diluting unit, and the ejector unit may form a second modified aerosol flow by mixing a second dilution gas flow with the first modified aerosol sample flow.

In addition to the diluting function, the ejector unit of the diluting device may operate as a pump, which draws the aerosol sample flow from the sampling point to a measuring instrument.

The first diluting unit may be arranged to form an annular protective layer, which surrounds the aerosol sample flow, in order to reduce particle loss in the second diluting unit. The annular protective layer may comprise or consist of the dilution gas. The first diluting unit may comprise e.g. an annular nozzle and/or a tubular gas-permeable element to form the annular protective layer around the aerosol sample flow. The protective layer may be formed by guiding dilution gas via the annular nozzle or through the permeable wall of the tubular element. The annular protective layer may substantially coaxially surround the aerosol sample flow.

The ejector unit may comprise an annular nozzle to form an annular high velocity gas jet around the first modified aerosol flow. A second dilution gas flow may be guided via the annular nozzle to form the annular gas jet. The gas of the annular gas jet may be effectively mixed with the first modified aerosol flow by turbulent mixing. The mixing may transfer momentum from the high velocity gas jet to the first modified aerosol flow, in order to draw the first modified aerosol flow to the ejector unit. Thus, the ejector unit may operate as a pump, which draws the aerosol sample flow from the sampling point.

The annular jet of diluting gas may reduce deposition of aerosol particles to the inner surfaces of the ejector unit. The annular gas jet of the ejector unit may operate as a protective layer between the first modified aerosol flow and the internal surface of the ejector unit, in order to reduce particle loss. The annular high velocity gas jet may reduce particle loss also in a situation where some (large) particles would be deposited on the internal surface of the mixing region of the ejector. The high velocity of annular jet may even detach aerosol particles from the surface of the ejector unit. The high velocity gas jet may immediately blow some deposited particles from the surface back into the second modified aerosol flow. The annular jet may return lost aerosol particles back into the modified sample flow.

The first modified aerosol sample flow drawn from the first diluting unit may be guided via a nozzle (NOZ2a in FIG. 1) of the ejector unit. The ejector unit may be arranged to provide a partial vacuum after the nozzle of the ejector unit, so as to provide choked flow condition for the first modified aerosol sample flow. The choked flow condition may allow determining the flow rate of the first modified aerosol sample flow from the inlet pressure of the diluting device. The flow rate of the first modified sample flow may be determined from the measured inlet pressure value. The choked flow condition of the nozzle may even allow establishing a reproducible linear function for determining the flow rate of the first modified aerosol sample flow from the measured inlet pressure. The ejector unit may simultaneously operate as a pumping device and as a flow regulating device for the first modified aerosol sample flow. As the pumping device, the ejector unit may have low loss of aerosol particles to the internal surfaces. As the flow regulating device, the ejector unit may provide a substantially linear relationship between the inlet pressure and the flow rate of the first modified aerosol sample flow. The flow rate of the primary sample flow may be determined e.g. by subtracting the flow rate of the first diluting gas flow from the flow rate of the first modified sample flow.

When using the ejector unit as the flow regulating device, the flow rate of the first modified aerosol sample flow may depend on the inlet pressure according to a reproducible function. Consequently, the dilution factor may be kept substantially independent of the varying inlet pressure by monitoring the inlet pressure, and by adjusting the dilution gas flow rates according to the inlet pressure.

The choked flow condition of the first modified aerosol sample flow may make the flow rate of the first modified aerosol sample flow substantially independent of the outlet pressure of the ejector unit. In this sense, the flow rates may be accurately controlled based on the inlet pressure without measuring the outlet pressure. In this sense, the dilution factor of the diluting device may be kept constant based on the inlet pressure without measuring the outlet pressure.

In an embodiment, the dilution gas flow rates may be adjusted based on the inlet pressure without measuring an outlet pressure of the ejector unit. In an embodiment, the dilution gas flow rates may be adjusted based on the inlet pressure without using a thermal mass flow sensor to measure a flow rate of the sample flow. In an embodiment, the dilution gas flow rates may be adjusted based on the inlet pressure without measuring a pressure difference between the inlet pressure and the outlet pressure.

The first diluting unit may interact with the ejector unit in several advantageous ways. The first diluting unit may provide a protective layer of diluting gas. The protective layer may at least partly surround the modified sample flow, which is guided into the ejector unit. The first diluting unit may reduce or prevent loss of aerosol particles to surfaces of the ejector unit. The annular protective layer formed by the first diluting unit may surround the aerosol flow so as to reduce or minimize particle loss in the ejector unit.

The first modified aerosol sample flow entering the ejector unit may have non-uniform distribution of particle concentration in the transverse direction. The particle concentration at the symmetry axis may be substantially higher than the particle concentration near the wall, due to the protective layer. The aerosol sample may be more completely mixed with the gas of the protective layer in the ejector unit, by the action of the turbulent high velocity gas jet.

The first diluting unit may reduce the concentration of volatile gases and/or particles, wherein the reduced concentration may reduce risk of condensation and/or nucleation.

The first diluting gas flow introduced via the first diluting unit may provide an increased flow rate of the first modified aerosol flow. The increased flow rate may facilitate attaining the choked flow condition in the ejector unit, so that the flow rate of the primary aerosol sample flow may depend on the inlet pressure in a substantially linear manner.

In addition to the diluting function, the diluting apparatus may operate as a pressure regulating device, which may provide a diluted aerosol flow with a selected dilution factor at a selected constant output pressure. The diluting apparatus may be arranged to provide a diluted aerosol flow from an output such that the output pressure may be substantially constant. The outlet pressure of the ejector unit may be constant and/or substantially equal to the ambient pressure, e.g. in order to facilitate guiding of the diluted sample flow to an aerosol measuring instrument. The outlet pressure of the ejector unit may be constant and substantially equal to the ambient pressure. In particular, the output pressure may be substantially equal to the atmospheric pressure (e.g. 1013 mbar).

The diluting device may be simple, rugged and stable. The mechanical structure of the diluting device may be simple and rugged and stable. In an embodiment, the diluting device does not comprise any moving parts. Consequently, the diluting device may be resistant to mechanical vibrations, which may be coupled to the diluting device e.g. from an operating engine or from an operating industrial process system. The dilution factor of the diluting device may remain constant during and after exposure to mechanical vibrations.

The inlet pressure of the aerosol sample flow may fluctuate e.g. in the range of 900 mbar to 1100 mbar. The apparatus may be arranged to operate such that the dilution factor is substantially independent of the inlet pressure $p_0$ e.g. in a situation where the inlet pressure $p_0$ varies in the range of 900 mbar to 1100 mbar. The apparatus may be arranged to operate such that the dilution factor is substantially independent of the inlet pressure $p_0$ e.g. in a situation where the inlet pressure $p_0$ is in the range of 90% to 110% of the outlet pressure of the ejector unit.

The dilution gas may be substantially particle-free gas. Depending on the application, the dilution gas may be e.g. air, nitrogen, or argon.

In an embodiment, the apparatus may comprise a control unit to adjust an upstream pressure of the diluting gas flow according to the varying inlet pressure of the aerosol sample flow, so as to keep the dilution factor substantially equal to a target value.

The apparatus may be arranged to divide a primary dilution gas flow into a first partial dilution gas flow and a second partial dilution gas flow. The first partial dilution gas flow may be guided to the first diluting unit. The second partial dilution gas flow may be guided to the second diluting unit.

The diluting apparatus may be arranged to operate such that loss of aerosol particles from the sample flow to the internal surfaces of the apparatus may be reduced or minimized. The flow rates and the internal nozzles of the diluting device may be arranged to reduce loss of particles.

The diluting device may be suitable for operation at elevated temperatures. For example, the inlet temperature of the aerosol sample flow may be e.g. in the range of 200° C. to 450° C. For example, the inlet temperature of the diluting gas may be e.g. in the range of 200° C. to 450° C. The aerosol sample flow may be guided to the diluting device e.g. via a hot or heated sampling line. In an embodiment, the diluting device may even be positioned inside a hot process duct.

The diluting apparatus may be arranged to operate such that the temperature of the aerosol sample may be kept above a minimum temperature value, in order to reduce or avoid altering the size distribution of aerosol particles of the aerosol sample flow. The minimum temperature value may be e.g. in the range of 200° C. to 450° C.

The dilution gas may be pre-heated before it is combined with the aerosol sample flow. The aerosol sample may comprise gaseous volatile compounds. Condensation of the gaseous volatile compounds of the aerosol sample may be reduced or avoided by diluting the aerosol sample with the pre-heated gas.

Adding heated diluting gas to the sample flow may also stabilize the temperature of the modified sample flow in the nozzle of the ejector unit, so as to improve accuracy of the constant dilution factor.

The apparatus may comprise a heater to heat diluting gas received from the pressure regulating valve. The heated diluting gas may be introduced to the sample flow via the first diluting unit and/or via the second diluting unit. In an embodiment, the apparatus may comprise a single pressure regulating valve and a single heater to provide heated pressurized diluting gas for the diluting device.

The diluting method and/or apparatus may be used when performing aerosol measurements, e.g. for determining whether aerosol emissions from an engine of a vehicle comply with the requirements defined in the Euro V, Euro V+ or Euro VI standard of the European Union.

BRIEF DESCRIPTION OF THE DRAWINGS

In the following examples, several variations will be described in more detail with reference to the appended drawings, in which FIG. 1 shows, by way of example, in a cross-sectional view, a diluting device, FIG. 2*a* shows, by way of example, in a cross-sectional view, a first diluting unit of the diluting device, FIG. 2*b* shows, by way of example, in a cross-sectional axial view, the diluting unit of FIG. 2*a,*

FIG. 2*c* shows, by way of example, in a cross-sectional view, an ejector diluting unit of the diluting device, FIG. 2*d* shows, by way of example, in a cross-sectional axial view, the ejector diluting unit of FIG. 2*c,*

FIG. 2*e* shows, by way of example, in a cross-sectional view, a diluting unit, which comprises a gas-permeable tunnel element, FIG. 2*f* shows, by way of example, in a cross-sectional axial view, the diluting unit of FIG. 2*e*

FIG. 3*a* shows, by way of example, flow rate of sample gas flow as the function of inlet pressure, and flow rate of dilution gas as the function of inlet pressure, in a situation where the upstream pressure of the dilution gas is equal to a constant value, FIG. 3*b* shows, by way of example, the dilution factor of the dilution device as the function of inlet pressure, in a situation where the upstream pressure of the dilution gas is equal to a constant value, FIG. 4*a* shows, by way of example, flow rate of sample gas flow as the function of inlet pressure, flow rate of dilution gas at a first upstream pressure, and flow rate of dilution gas at a second upstream pressure, FIG. 4*b* shows, by way of example, the dilution factor of the dilution device as the function of inlet pressure at a first upstream pressure, and the dilution factor of the dilution device as the function of inlet pressure at a second upstream pressure, FIG. 4*c* shows, by way of example, a control function for adjusting the upstream pressure of dilution gas according to the inlet pressure, FIG. 5 shows, by way of example, in a cross-sectional view, the diluting device arranged to operate as a part of an aerosol measurement apparatus, FIG. 6*a* shows, by way of example, in a cross-sectional view, a diluting device, FIG. 6*b* shows, by way of example, in a cross-sectional view, the diluting device arranged to operate as a part of an aerosol measurement apparatus, and FIG. 7 shows, by way of example, method steps for providing a modified sample and for obtaining an aerosol measurement result.

DETAILED DESCRIPTION

Referring to FIG. 1, the diluting device 100 may comprise a first diluting unit DU1 and a second diluting unit DU2 connected in series. An outlet end of the first diluting unit DU1 may be connected to the inlet end of the second diluting unit DU2. The diluting device 100 may comprise an inlet 101 for receiving a primary aerosol sample flow FG0. The diluting device 100 may comprise an outlet 102 for providing a second modified sample flow FG2. The first diluting unit DU1 may form a first modified sample flow FG1 by combining the primary aerosol sample flow FG0 with a first diluting gas flow DG1. The second diluting unit DU2 may form the second modified sample flow FG2 by mixing the first modified sample flow FG1 with a second diluting gas flow DG2. The aerosol sample flow FG0 may have an inlet pressure $p_0$ at the inlet 101. The second modified sample flow FG2 may have an outlet pressure $p_2$ at the outlet 102.

The first diluting unit DU1 may comprise e.g. a central nozzle NOZ1*a* to form a central portion J11 (FIG. 2*a*) of the first modified aerosol sample flow FG1, by guiding the primary sample flow FG0 via the nozzle NOZ1*a*. The first diluting unit DU1 may comprise an annular nozzle NOZ1*b* to form an annular protective layer J12 (FIG. 2*a*) by guiding the first dilution gas flow DG1 via the annular nozzle NOZ1*b*. The central nozzle NOZ1*a* and the annular nozzle NOZ1*b* may together form a nozzle assembly NOZ1. The annular protective layer J12 may surround the central portion J11 of the aerosol sample flow FG1. The nozzle NOZ1*a* may form a central aerosol sample jet J11 from the primary sample flow FG0, by guiding the primary sample flow FG0 via the nozzle NOZ1*a*. The first dilution gas flow DG1 may be guided via the annular nozzle NOZ1*b* for forming the protective layer J12. The first diluting unit DU1 may be arranged to form an annular protective layer J12 from the first diluting gas flow DG1.

Alternatively, or in addition, the first diluting unit DU1 may comprise a porous tunnel element ELE1 (FIG. 2*e*) to form an annular protective layer J12, which may surround a central portion J11 of the aerosol sample flow FG1. The annular protective layer J12 may surround the aerosol sample flow guided through the porous tunnel element ELE1 of the first diluting unit DU1. The central portion J11 of the modified aerosol sample flow FG1 may be formed e.g. by guiding the primary sample flow FG0 axially via the tunnel element ELE1 and/or by introducing the primary sample flow FG0 into the tunnel element ELE1 axially via a nozzle (e.g. NOZ1*a*).

The first diluting unit DU1 may be arranged to form a protective diluting layer J12, which may coaxially surround the central portion J11 of the aerosol sample flow FG1. The first diluting unit DU1 comprising the annular nozzle NOZ1*b* and/or a tunnel element ELE1 may also be called e.g. as a coaxial diluting unit.

The concentration of aerosol particles of the first modified flow FG1 may be substantially lower than the concentration of aerosol particles of the primary sample flow FG0, due to the dilution in the first diluting unit DU1.

The second diluting unit DU2 may be called e.g. as ejector unit. The ejector unit DU2 may operate as pump and as a diluting device. The pumping effect of the ejector unit DU2 may draw the primary sample flow FG0 into the first diluting unit DU1.

The first diluting unit DU1 may operate as a diluting device and as a protective device. The first diluting DU1 may reduce or prevent deposition of aerosol particles to the internal surfaces of the ejector unit DU2. The first diluting unit DU1 may protect the ejector unit DU2 from contamination. The annular layer J12 formed of the first diluting gas flow DG1 may reduce loss of aerosol particles in the ejector unit DU2. The annular layer of the first diluting gas DG1 may reduce contamination of the ejector unit DU2.

The gas of the first diluting gas flow DG1 may be e.g. substantially particle-free air or nitrogen.

The gas of the second diluting gas flow DG2 may be e.g. substantially particle-free air or nitrogen.

The ejector unit DU2 may comprise a mixing nozzle assembly NOZ2 and a mixing region MIX2. The nozzle assembly NOZ2 may comprise a first nozzle NOZ2*a* and a second nozzle NOZ2*b* (FIG. 2*b*). The first nozzle NOZ2*a* may guide the first modified aerosol flow FG1 to the mixing region MIX2. The second nozzle NOZ2*b* may form an annular gas jet around the first modified aerosol flow FG1. The second nozzle NOZ2*b* may be an annular nozzle. The second diluting gas DG2 guided via the nozzle NOZ2*b* may be mixed with the first modified sample FG1 in the mixing region MIX2, in order to form the second modified sample FG2. The ejector unit DU2 may comprise a duct element 154 to define the mixing region MIX2. The ejector unit DU2 may comprise a nozzle element 153 to define the annular nozzle NOZ2*b* together with the duct element 154.

An outlet end of the first diluting unit DU1 may be directly coupled to the inlet end of the ejector unit DU2. The distance between the nozzle NOZ1*a* and the nozzle NOZ2*a* may be e.g. smaller than 10 times the inner diameter of the nozzle NOZ1*a*.

The mixing with the injected second diluting gas DG2 may cause a pumping effect, by transferring momentum from the injected gas DG2 to the diluted first modified sample flow FG1 in the mixing region MIX2. The ejector unit DU2 may draw the first modified flow FG1 from the first diluting unit DU1. The ejector unit DU2 may be arranged to pump the first modified sample flow FG1 to the ejector unit DU2 by transferring momentum of the second dilution gas flow DG2 to the first modified sample flow FG1. The concentration of aerosol particles of the second modified flow FG2 may be substantially lower than the concentration of aerosol particles of the first modified sample flow FG1, due to the dilution in the ejector unit DU2.

The ejector unit DU2 may draw sample flow into the diluting device 100. The diluting device 100 may have an inlet pressure $p_0$ at the inlet 101 of the diluting device 100. The diluting device 100 may have an outlet pressure $p_2$ at the outlet 102 of the diluting device 100. The primary sample flow FG0 may be at the inlet pressure $p_0$ at the inlet 101. The second modified sample flow FG2 may be at the outlet pressure $p_2$ at the outlet 102. The ejector unit DU2 may be arranged to cause a pressure difference $p_2-p_0$. $p_1$ may denote the pressure at the inlet of the ejector unit DU2. The pressure $p_1$ may be called e.g. as the intermediate pressure. The pressure difference $p_1-p_0$ between inlet 101 of the first diluting unit DU1 and the inlet of the ejector unit DU2 may be small or negligible when compared with the pressure difference $p_2-p_0$. The intermediate pressure $p_1$ at the inlet of the ejector unit DU2 may be substantially equal to the inlet pressure $p_0$.

The second diluting gas flow DG2 injected to the mixing zone MIX2 of the ejector unit DU2 may create a local partial vacuum in the mixing region MIX2. The pressure $p_E$ may denote minimum pressure of the ejector unit DU2, at the exit of the nozzle NOZ2*a*. Choked flow may occur in the nozzle NOZ2*a* of the ejector unit DU2 due to the pressure difference $(p_1-p_E)$ over the nozzle NOZ2*a*. Choked flow may occur in the nozzle NOZ2*a* when the ratio $p_E/p_1$ is lower than the critical pressure ratio. The ejector unit DU2 may be arranged to operate such that the pressure $p_E$ is e.g. lower than or equal to 500 mbar, in order to ensure choked flow condition for the first modified sample flow FG1.

The pressure difference $p_1-p_0$ between inlet 101 of the first diluting unit DU1 and the inlet of the ejector unit DU2 may be small or negligible when compared with the pressure difference $p_1-p_E$ caused by the ejector unit DU2.

The dilution device 100 may comprise one or more elements 151, 152, 153, 154 to operate as the ducts and nozzles of the device 100. In an embodiment, the dilution device 100 may even be implemented as a single piece, which may be produced e.g. by 3D printing.

The diluting device 100 may have a symmetry axis AX1. The inner surfaces of the elements 151, 152, 153, and/or 154 may be axially symmetric with respect to the symmetry axis AX1, e.g. as shown in FIGS. 2b and 2d.

$m'_{DG1}$ may denote the mass flow rate of the first diluting gas flow DG1. $m'_{DG2}$ may denote the mass flow rate of the second diluting gas flow DG2.

Figure 5:
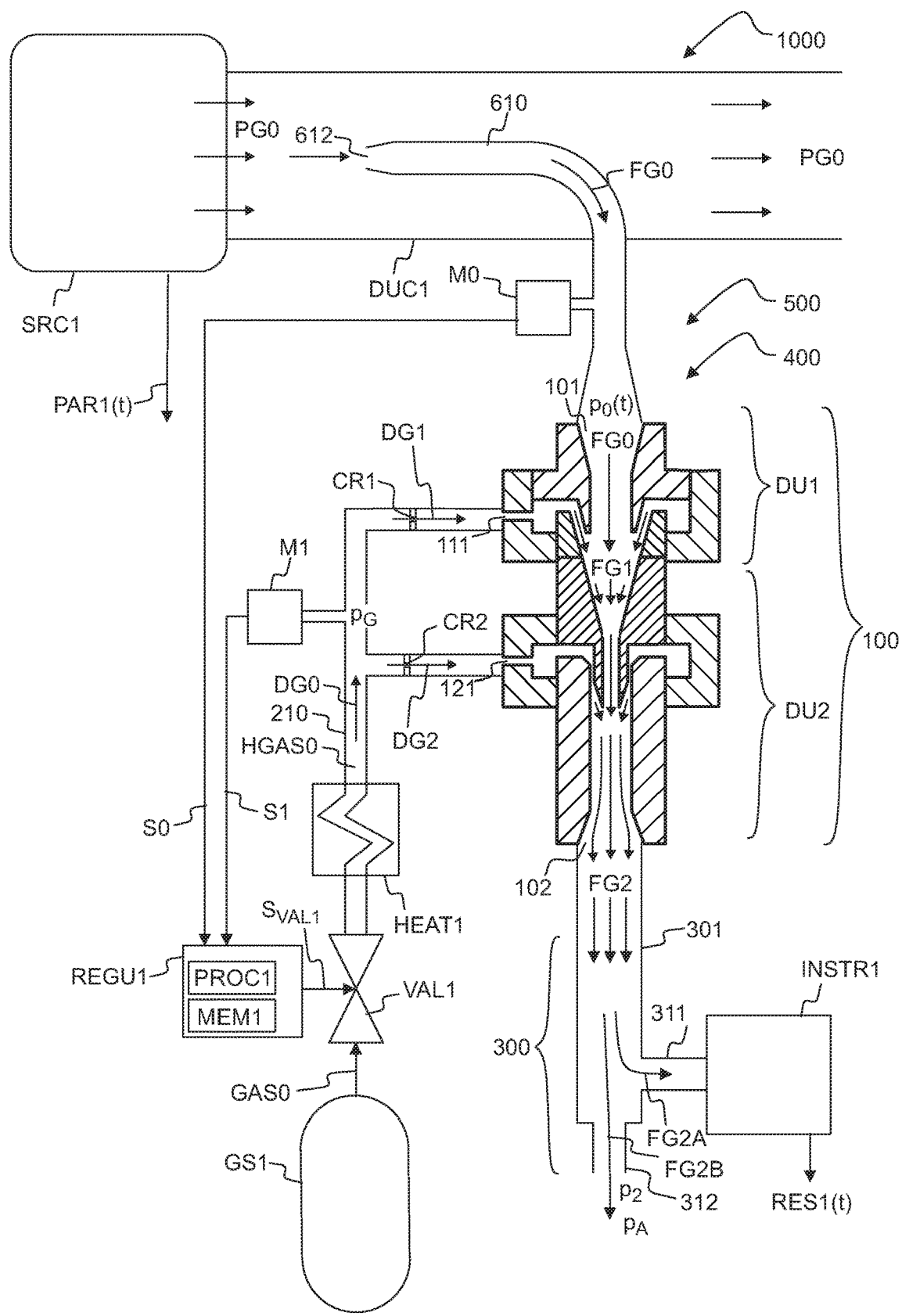

The flow rates $m'_{DG1}$, $m'_{DG2}$ may be controlled e.g. by using critical orifices CR1, CR2 to restrict the flows DG1, DG2, and by adjusting an upstream pressure $p_G$ of the critical orifices CR1, CR2 (see FIG. 5). The first diluting gas flow DG1 may be restricted by a first critical orifice CR1, and/or the second diluting gas flow DG2 may be restricted by a second critical orifice CR2. The upstream pressure of the critical orifice may be kept above a predetermined limit in order to ensure that the flow rate of the dilution gas substantially independent of the inlet pressure of the aerosol sample flow.

Alternatively, or in addition, the diluting apparatus may optionally comprise one or more mass flow controllers to adjust the flow rates $m'_{DG1}$, $m'_{DG2}$.

The ratio ($m'_{DG1}/m'_{DG2}$) of the flow rate ($m'_{DG1}$) of the first diluting gas flow (DG1) to the flow rate ($m'_{DG2}$) of the second diluting gas flow (DG2) may be e.g. in the range of 0.2 to 3.0.

Figure 6A:
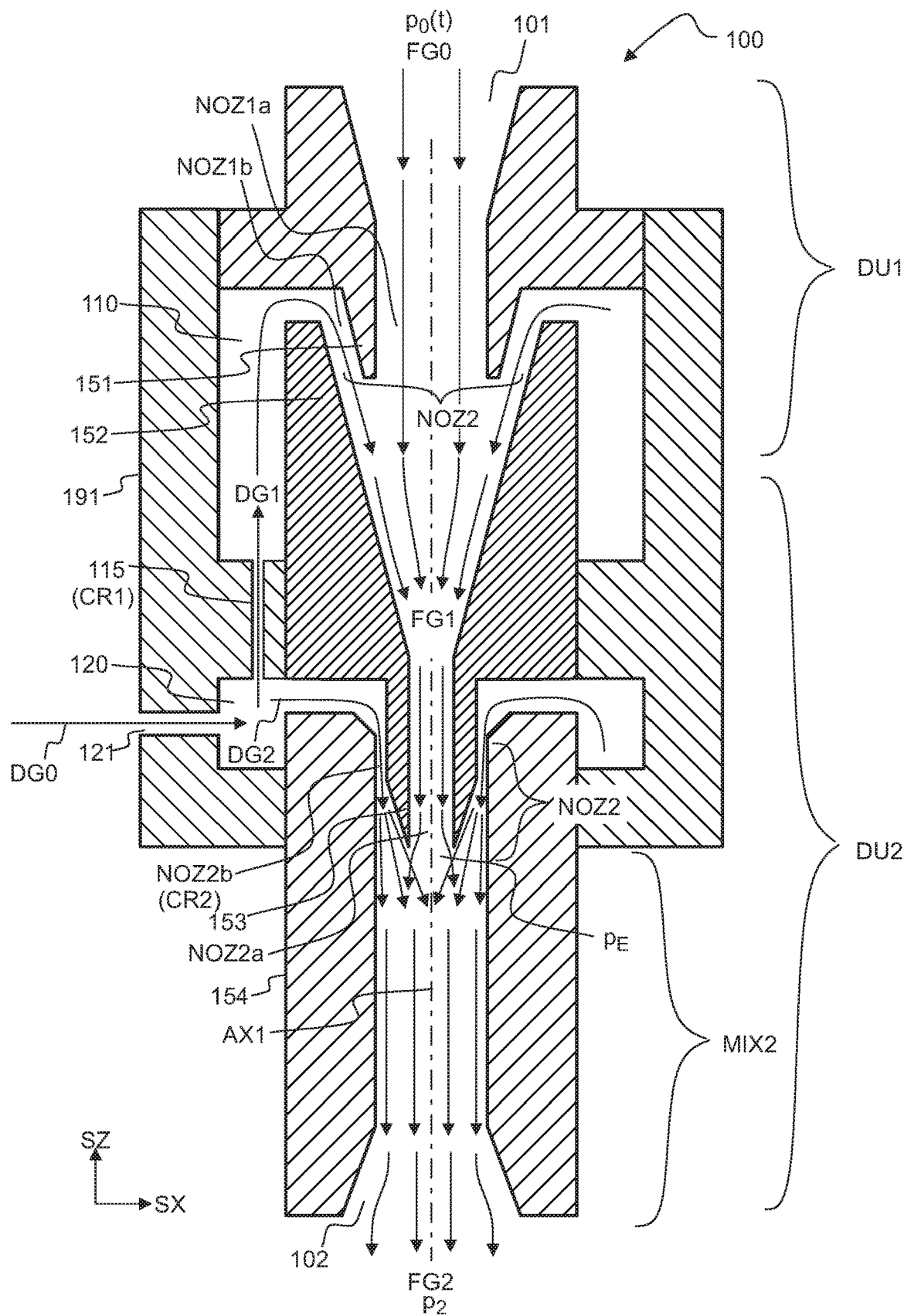

In an embodiment, a primary dilution gas flow DG0 may be divided into the first diluting gas flow DG1 and the second diluting gas flow DG2 (see FIG. 5 and FIG. 6a). The mass flow rate $m'_{DG0}$ of the primary dilution gas flow DG0 may be equal to the sum of the mass flow rates $m'_{DG1}$, $m'_{DG2}$.

Figure 2A:
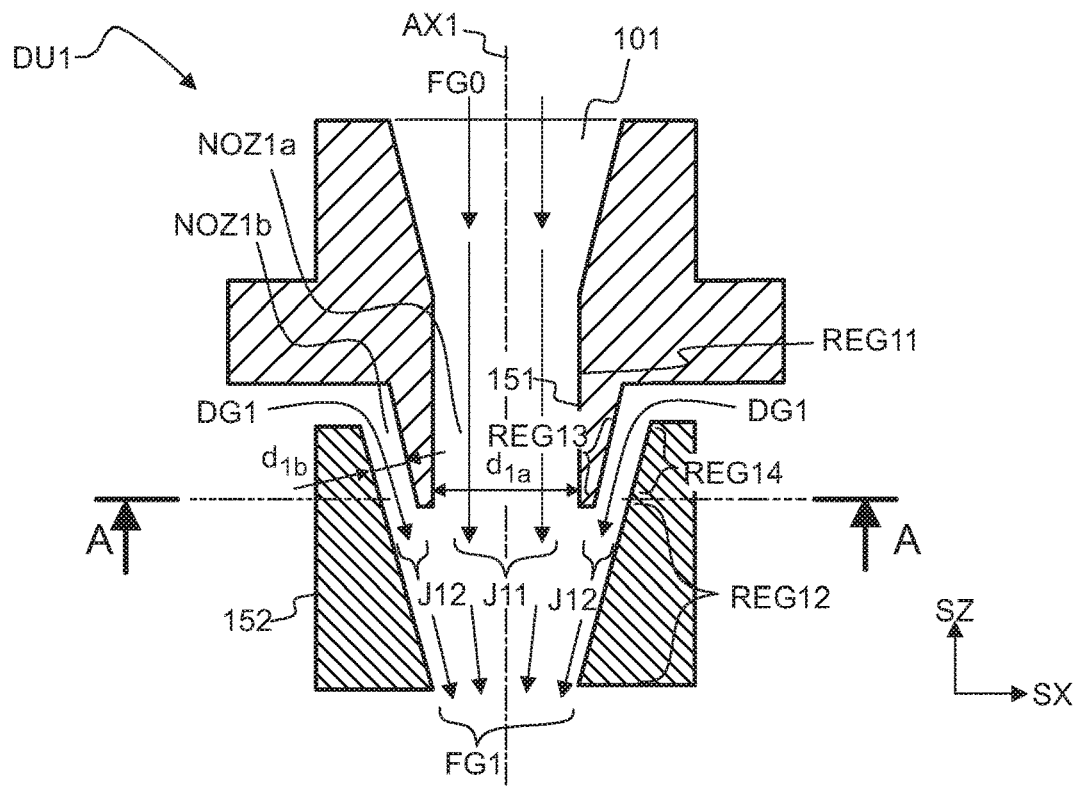
Figure 2B:
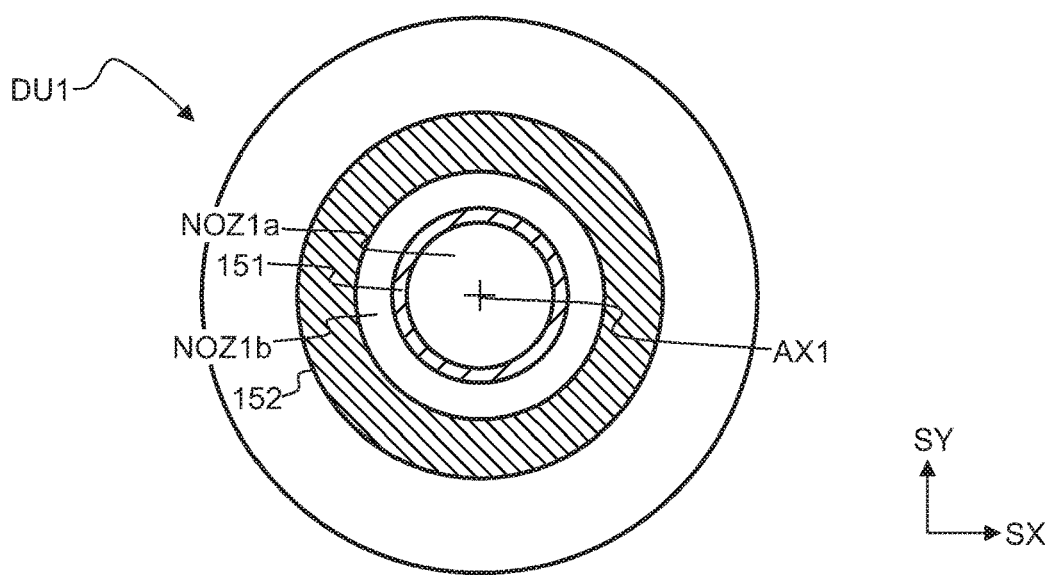
Figure 2C:
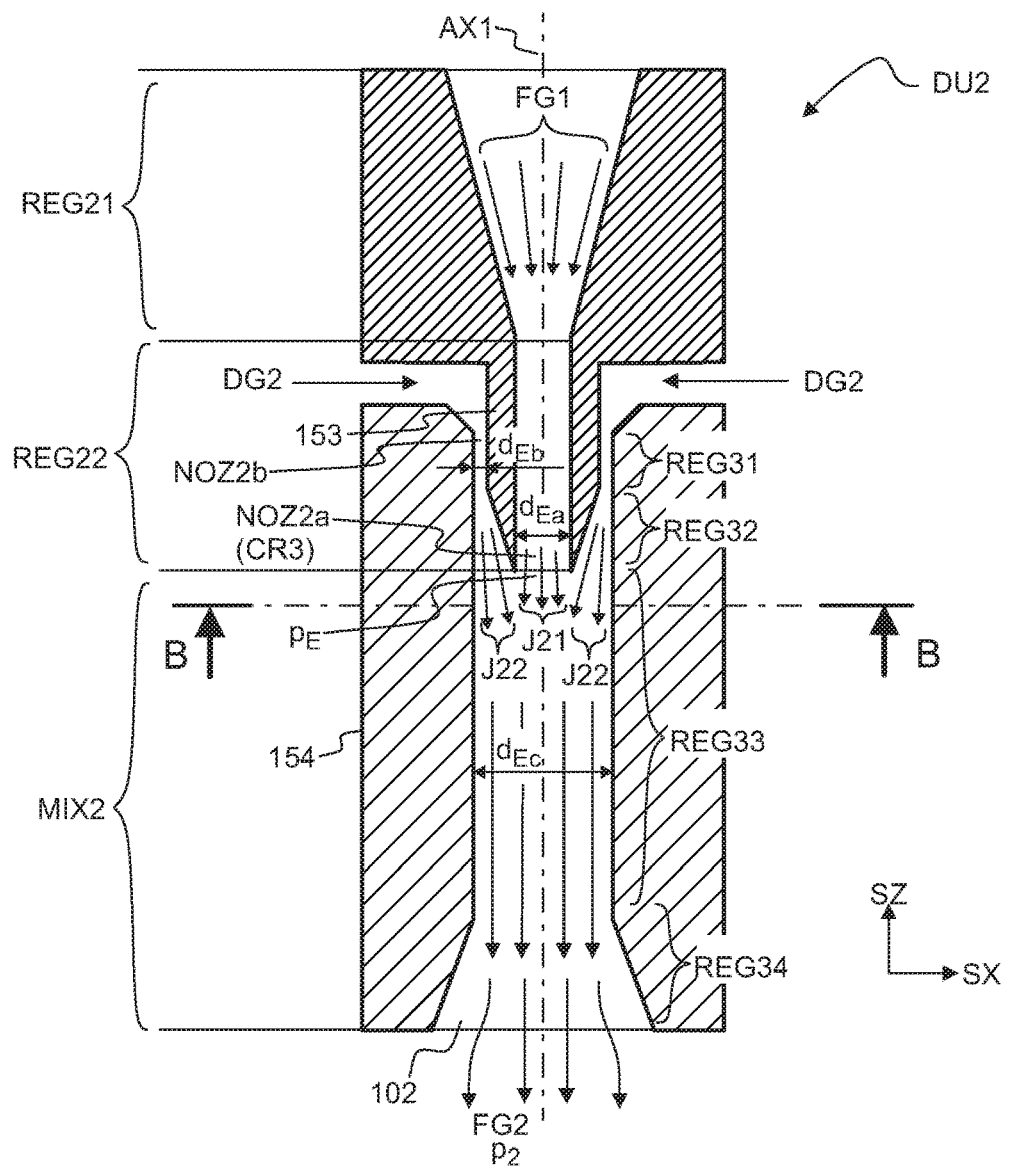
Figure 2D:
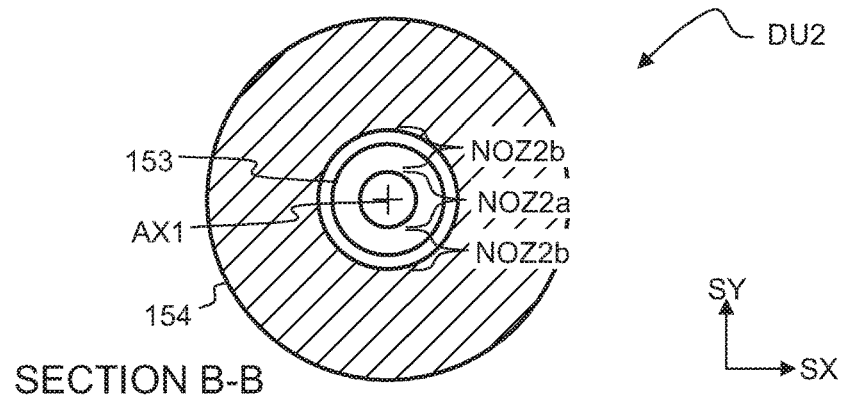
Figure 2E:
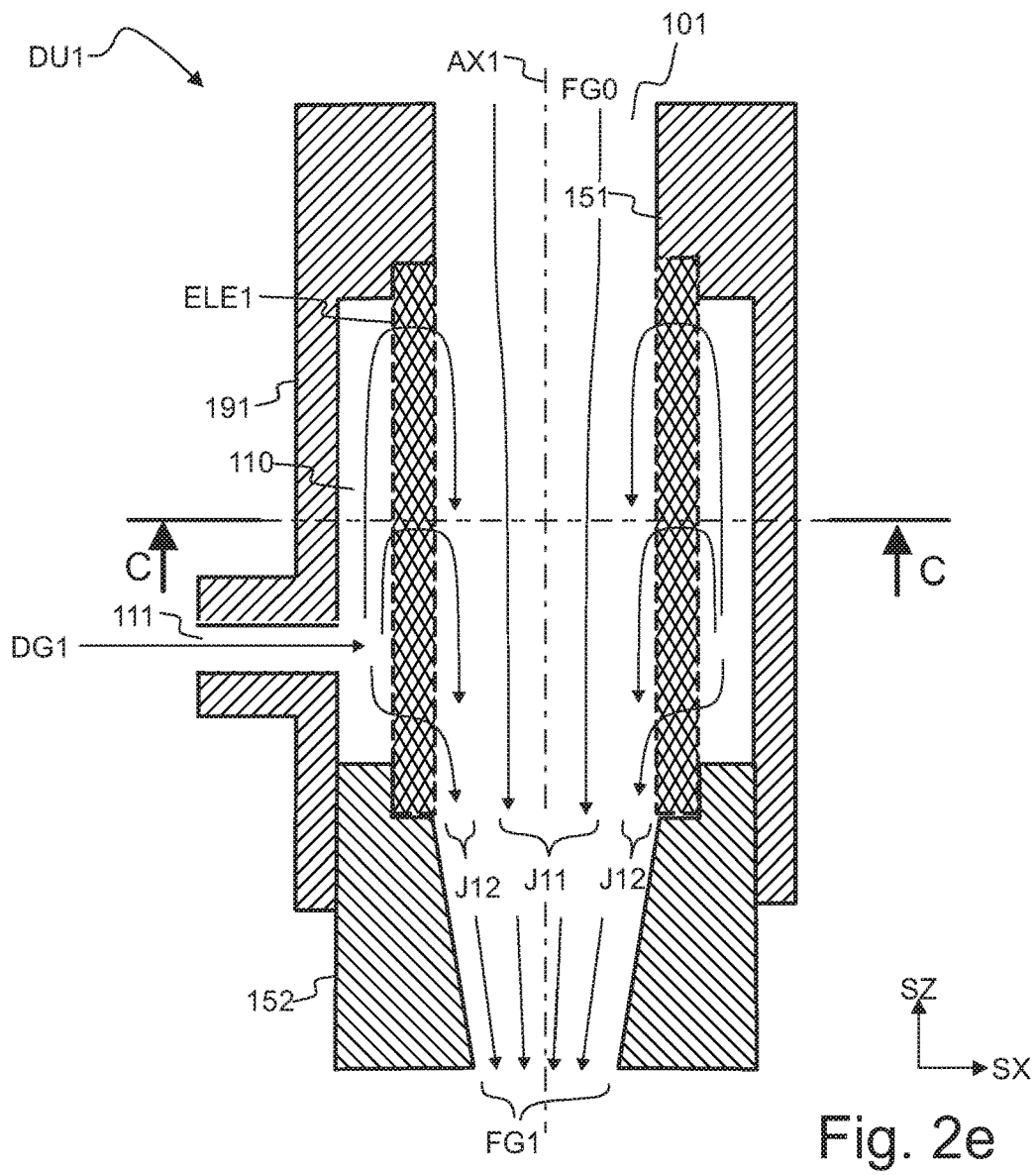

The diluting device 100 may comprise a first gas distribution space 110 for distributing the first diluting gas flow DG1 to the nozzle NOZ1b or to a gas-permeable element ELE1 of the first diluting unit DU1 (FIG. 2e). The first gas distribution space 110 may be at least partly defined e.g. by a first housing 191. The diluting device 100 may comprise an inlet 111 for guiding the first diluting gas flow DG1 to the first gas distribution space 110.

The diluting device 100 may comprise a second gas distribution space 120 for distributing the second diluting gas flow DG2 to the nozzle NOZ2b of the ejector unit DU2. The second gas distribution space 120 may be at least partly defined e.g. a second housing 192. The diluting device 100 may comprise a dilution gas inlet 121 for guiding the second diluting gas flow DG2 to the second gas distribution space 120.

The first housing 191 and/or the second housing 192 may optionally operate e.g. as a frame of the diluting device 100 (see e.g. FIG. 6a).

Referring to FIGS. 2a and 2b, the first diluting unit DU1 may comprise an inner nozzle NOZ1a and an outer nozzle NOZ1b. The inner nozzle NOZ1a may form a first central aerosol jet J11 by guiding the primary aerosol sample flow FG0. The outer nozzle NOZ1b may form a first annular protective gas jet J12 by guiding the first diluting gas flow DG1. The first annular protective gas jet J12 may at least partly surround the first central aerosol jet J11. In an embodiment, the jet J12 may substantially completely surround the jet J11.

The inner nozzle NOZ1a may be at least partly defined by a surface portion REG11 of an inner surface of a nozzle element 151. The outer nozzle NOZ1b may be e.g. a substantially annular gap defined by surface portions REG13, REG14. The portion REG13 may be e.g. an outer surface portion of a nozzle element 151, and the portion REG14 may be e.g. an inner surface portion of a second nozzle element 152. A surface portion REG12 of the nozzle element 152 may operate as a duct for the first modified aerosol flow FG1.

The outer nozzle NOZ1b may be also be defined by surface portions REG13, REG14 of the same part (e.g. the element 151). The element 151 may be produced e.g. by 3D printing, so as to form the nozzle NOZ1a and/or the nozzle NOZ1b.

The nozzle NOZ1a may have an inner diameter $d_{1a}$. The annular nozzle NOZ1b may have a gap $d_{1b}$ in the radial direction.

SX, SY and SZ denote orthogonal directions. The direction SZ may be parallel with the symmetry axis AX1.

The nozzles NOZ1a, NOZ1b may be substantially axially symmetric. The central jet J11 and/or the protective jet J12 may be substantially axially symmetric with respect to the axis AX1.

Referring to FIGS. 2c and 2d, the ejector diluting unit DU2 may comprise an inner nozzle NOZ2a and an outer nozzle NOZ2b. The inner nozzle NOZ2a may form a second central aerosol jet J21 by guiding the first modified aerosol sample flow FG1. The outer nozzle NOZ2b may form a second annular gas jet J22 by guiding the second diluting gas flow DG2. The second annular gas jet J22 may at least partly surround the second central aerosol jet J21. In an embodiment, the annular jet J22 may substantially completely surround the second central aerosol jet J21. The nozzles NOZ2a, NOZ2b may be substantially axially symmetric. The central jet J21 and/or the annular jet J22 may be substantially axially symmetric with respect to the axis AX1.

The ejector unit DU2 may comprise a converging entry duct REG21, a constricted duct REG22, and a mixing region MIX2. The nozzle NOZ2a may guide the first modified aerosol sample flow FG1 to the mixing region MIX2. The nozzle NOZ2b may guide the second diluting gas flow DG2 to the mixing region MIX2.

The mixing region MIX2 may comprise e.g. a cylindrical duct portion REG33 and/or a diverging duct portion REG34. The mixing region MIX2 may have an inner diameter $d_{Ec}$.

The constricted portion REG22 and the nozzle NOZ2a may have an inner diameter $d_{Ea}$. The nozzle NOZ2b may have a gap width $d_{Eb}$ in the radial direction. $p_E$ may denote the minimum pressure of the ejector unit DU2, at the exit of the nozzle NOZ2a. The NOZ2a may operate as a critical orifice CR3 for the first modified sample flow FG1. Choked flow may occur in the nozzle NOZ2a when the ratio $p_E/p_1$ is lower than the critical pressure ratio. The ejector unit DU2 may be arranged to operate such that the pressure $p_E$ is e.g. lower than or equal to 500 mbar, in order to ensure choked flow condition for the first modified sample flow FG1. The inner diameter $d_{Ea}$ of the nozzle NOZ2a of the ejector unit DU2 may be e.g. in the range of 1 mm to 3 mm, e.g. substantially equal to 1.5 mm.

The inner diameter $d_{1a}$ of the nozzle NOZ1a of the first diluting unit DU1 may be substantially greater than the inner diameter $d_{Ea}$ of the nozzle NOZ2a of the ejector unit DU2, e.g. in order to ensure that the pressure difference ($p_0$-$p_1$) over the nozzle NOZ1a of the first diluting unit DU1 may be small or negligible when compared with the pressure difference ($p_1$-$p_E$) caused by the ejector unit DU2. In case of a gas-permeable tunnel element ELE1 (FIGS. 2e and 2f), the inner diameter $d_{1a}$ of the element ELE1 be substantially greater than the diameter $d_{Ea}$, to ensure that the pressure difference ($p_0$-$p_1$) over the element ELE1 may be small or negligible when compared with the pressure difference ($p_1$-$p_E$) caused by the ejector unit DU2. The inner diameter $d_{1a}$ or $d_{ELE1}$ of the first diluting unit DU1 may be e.g. in the range of 2 to 10 times the inner diameter $d_{Ea}$ of the nozzle NOZ2a of the ejector unit DU2, in order to ensure low relative pressure difference over the nozzle NOZ1a or tunnel element ELE1 of the first diluting unit DU1. The inner diameter $d_{1a}$ or $d_{ELE1}$ may be e.g. in the range of 3 to 5 times the inner diameter $d_{Ea}$.

The inner nozzle NOZ2a may be at least partly defined by an inner surface portion of a nozzle element 153. The outer nozzle NOZ2b may be at least partly defined by an outer surface portion of the element 153. The outer nozzle NOZ2b may be at least partly defined by a substantially annular gap defined between nozzle elements 153, 154. The outer nozzle NOZ2b may optionally comprise diverging region REG32, so as to further accelerate the second diluting gas DG2 to supersonic velocities. The maximum gas velocity of the second annular gas jet J22 may even be higher than the speed of sound. The supersonic velocity may provide more efficient mixing, and/or more effective pumping effect. The supersonic velocity may further reduce the effect of inlet pressure $p_0$ on the flow rate of the primary sample aerosol flow FG0. In particular, the diverging region REG32 of the nozzle NOZ2b may operate as a part of an annular deLaval nozzle.

The ejector unit DU2 may comprise one or more substantially cylindrical surface portions REG31 to at least partly define the annular nozzle NOZ2b. An outer surface of the nozzle element 153 may comprise a substantially cylindrical surface portion (REG31) and/or an inner surface of the nozzle element 154 may comprise a substantially cylindrical surface portion (REG31). The inner portion of the nozzle NOZ1b may sometimes be slightly displaced with respect to the outer portion of the nozzle, due to manufacturing tolerances.

The inner nozzle element 153 may sometimes be slightly displaced with respect to the outer nozzle element 154. Using the cylindrical surface portion REG31 may reduce or avoid an effect of positioning error to the flow rate of the diluting gas DG2 guided via the nozzle NOZ2b.

The outer nozzle NOZ2b may be also be defined by surface portions of the same part (e.g. the nozzle element 151, 152, 153 or 154). For example, the nozzle element 153 of the ejector unit DU2 may also operate as a duct and as a nozzle element of the first diluting unit DU1 (FIG. 6a). The part or parts may be produced e.g. by 3D printing, so as to form the nozzle NOZ2a and/or the nozzle NOZ2b.

The outer nozzle element 154 may define a single annular nozzle NOZ2b together with the inner nozzle element 153. The ejector unit DU2 may comprise a second gas distributing space 120 for distributing the second diluting gas DG2 to the nozzle NOZ2b. The ejector unit DU2 may comprise a dilution gas inlet 121 for guiding dilution gas DG2 to the second distribution space 120.

Figure 2F:
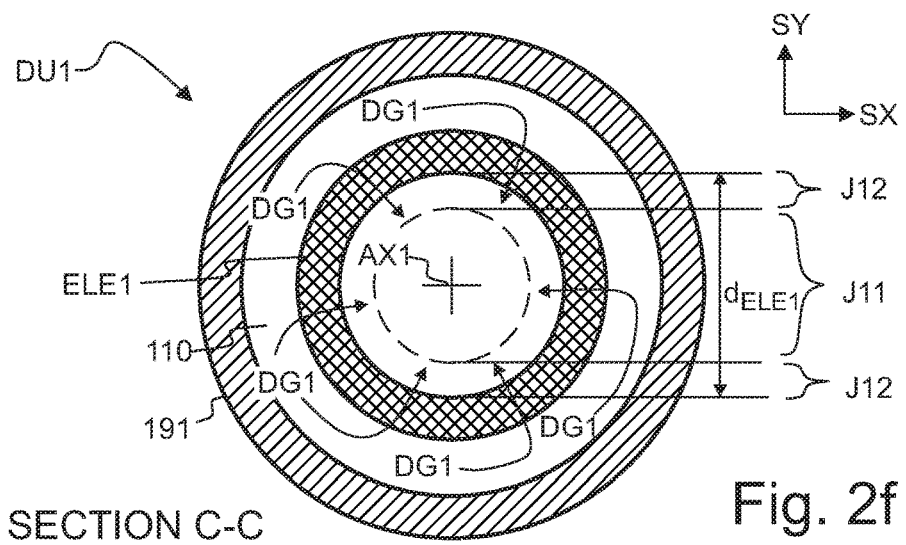

FIGS. 2e and 2f show a first diluting unit DU1, which comprise a gas-permeable tubular element ELE1. The element ELE1 may have e.g. a porous and/or perforated wall. The primary aerosol sample flow FG0 may be guided in the direction of the axis AX1 through a central duct of the tubular element ELE1. The first diluting gas DG1 may be guided through the gas-permeable wall of the tubular element ELE1, in order to form the first protective layer J12 of diluting gas around the first central aerosol jet J11. The first diluting unit DU1 may also be called e.g. a tunnel dilution unit. The tunnel dilution unit DU1 of FIG. 2e may be used instead of the unit DU1 of FIG. 2a. The diluting unit DU1 of FIG. 2e may be used in addition to the diluting unit DU1 of FIG. 2a. The element ELE1 may be substantially axially symmetric. The central jet J11 and/or the protective layer J12 may be substantially axially symmetric with respect to the axis AX1.

The tunnel unit DU1 may comprise a housing 191. The element ELE1 may define an annular first gas distribution space 110 together with the housing 191. The interior of the element ELE1 may be arranged to operate as a duct for the primary sample flow FG0. The first diluting gas DG1 guided to the annular space 110 may move through the wall of the element ELE1 from the annular space 110 to the interior of the element ELE1. The tunnel unit DU1 may comprise an inlet 111 for guiding the first diluting gas DG1 into the annular space 110. The element ELE1 may comprise e.g. a porous and/or perforated material. The material of the element ELE1 may be e.g. metal, ceramic, glass or plastic. The element ELE1 may be e.g. made of sintered metal or sintered ceramic. The element ELE1 may be e.g. made of perforated metal. The element ELE1 may have an inner diameter $d_{ELE1}$.

FIGS. 3a to 4c illustrate situations where second dilution gas DG2 is guided to the ejector unit DU2 via a critical orifice. The nozzle NOZ2a of the ejector unit DU2 may operate as a critical orifice for the first modified aerosol sample flow FG1. The flow rate of the primary aerosol sample flow FG0 and/or the flow rate of the second dilution gas DG2 may depend on the inlet pressure $p_0$, and/or on the upstream pressure $p_G$ of the second dilution gas DG2.

For example, the flow rate m'FG0 of the primary aerosol sample flow FG0 at the inlet pressure $p_0$=1000 mbar may be used as a reference flow rate m'$_{REF}$. In other words m'$_{REF}$=m'$_{FG0}$ when $p_0$=1000 mbar.

Figure 3A:
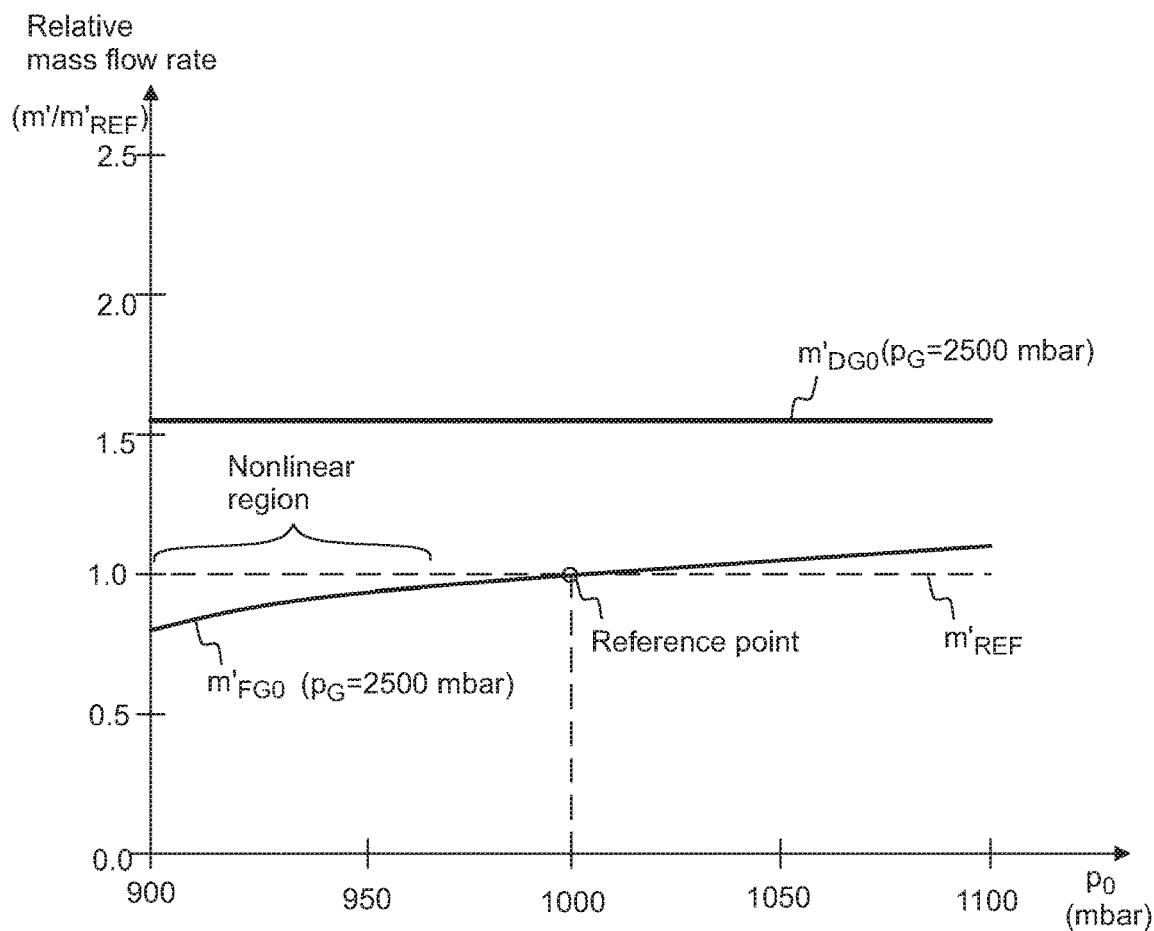

Referring to FIG. 3a, the upstream pressure $p_G$ of the diluting gas flow or flows DG0, DG1, DG2 may be selected to be higher than or equal to a predetermined limit in order to ensure choked flow condition for the diluting gas flows. Consequently, the flow rate m'$_{DG2}$ of the second diluting gas DG2 may be substantially independent of the inlet pressure $p_0$. The total flow rate m'$_{DG0}$ of diluting gas guided to the diluting device 100 may be substantially independent of the inlet pressure $p_0$.

The flow rate of the primary sample flow FG0 may depend on the inlet pressure $p_0$. The minimum pressure $p_E$ of the ejector unit DU2 may depend on the upstream pressure $p_G$ of the second diluting gas DG2 and on the inlet pressure $p_0$. The upstream pressure $p_G$ of the second diluting gas DG2 may be selected to be higher than or equal to a predetermined limit in order to ensure choked flow condition for the first modified aerosol flow FG1 guided via the nozzle NOZ2a of the ejector unit DU2.

The high velocity second annular gas jet J22 ejected from the nozzle NOZ2b may cause a partial vacuum downstream of the nozzle NOZ2a. $p_E$ denotes the minimum pressure of the second modified sample flow FG2. If the upstream pressure $p_G$ of the second diluting gas DG2 is too low, then the pressure ratio $p_E/p_0$ may be higher than the critical pressure ratio, which is required to provide choked flow through the nozzle NOZ2a of the ejector unit DU2.

FIG. 3a shows, by way of example, how the flow rate m'$_{FG0}$ of the primary sample gas FG0 may depend in a nonlinear manner on the inlet pressure $p_0$. This may indicate that the pressure ratio $p_E/p_0$ is higher than the critical pressure ratio which is needed to provide choked flow through the nozzle NOZ2A of the ejector unit DU2, in a situation where the inlet pressure $p_0$ is lower than a reference pressure (e.g. 1000 mbar).

Figure 3B:
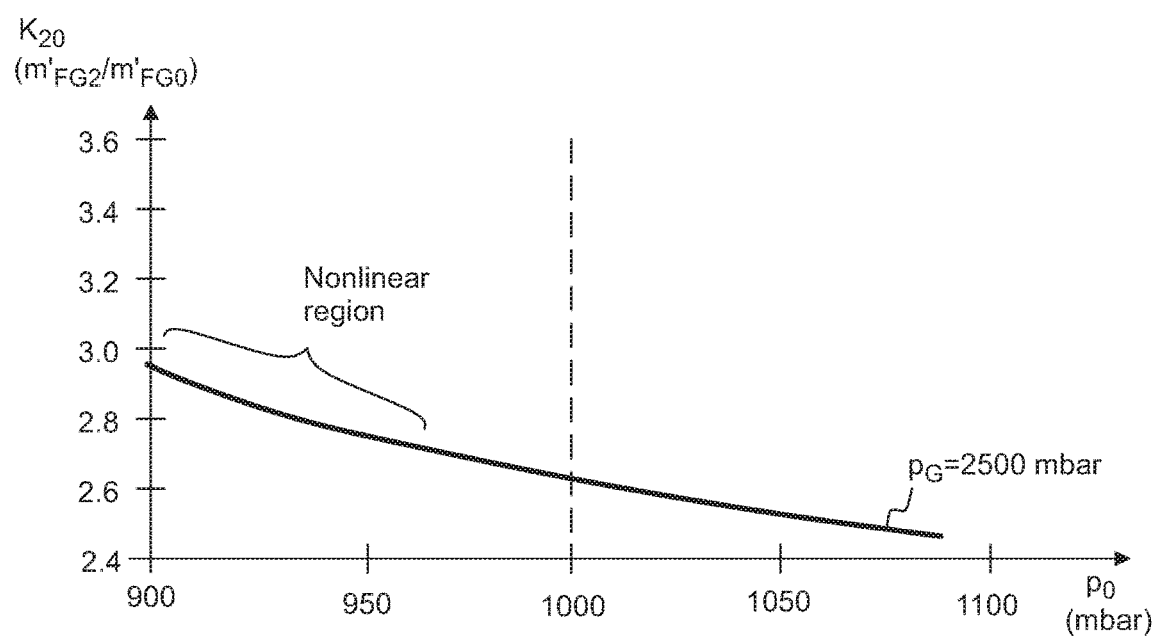

FIG. 3b shows, by way of example, the dilution factor $K_{20}$ of the diluting device 100 as the function of inlet pressure $p_0$, in a situation where the upstream pressure $p_G$=2500 mbar. The dilution factor $K_{20}$ is equal to the ratio $m'_{FG2}/m'_{FG0}$.

$m'_{FG0}$ denotes the mass flow rate of the primary aerosol sample flow FG0 guided to inlet 101 of the diluting device 100. $m'_{FG2}$ denotes the mass flow rate of the second modified aerosol sample flow FG2 guided from the output 102 of the diluting device 100.

FIG. 3b shows, by way of example, how the dilution factor $K_{20}$ may depend in a nonlinear manner on the inlet pressure $p_0$, in a situation where the upstream pressure $p_G$ is not high enough to ensure chocked flow condition at inlet pressures $p_0$ which are lower than a reference pressure (e.g. 1000 mbar).

Figure 4A:
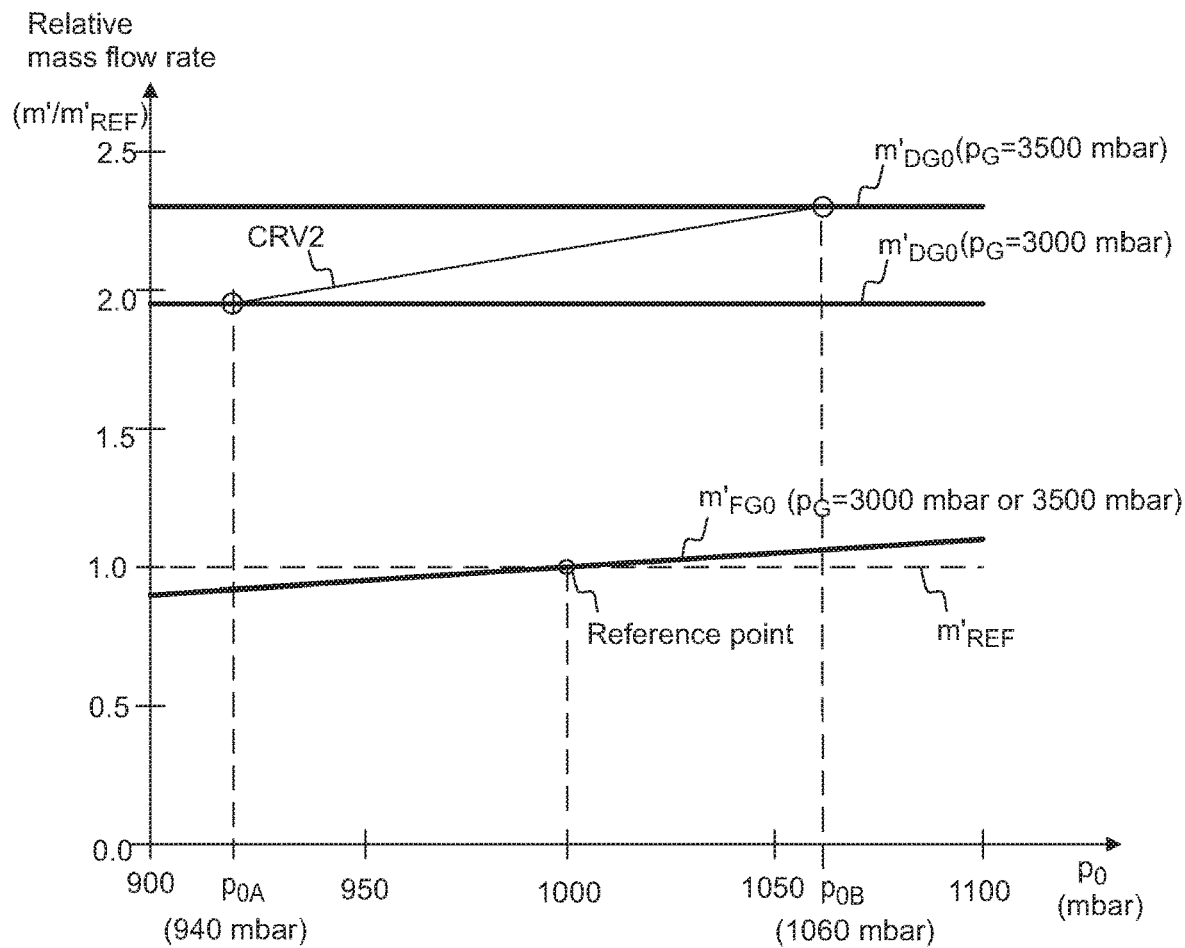

Referring to FIG. 4a, the upstream pressure $p_G$ of the second diluting gas DG2 may be selected to be higher than or equal to a predetermined limit in order to ensure choked flow condition for the first modified aerosol flow FG1 in a predetermined range of inlet pressures $p_0$ from a lower limit $p_{0A}$ to a higher limit $p_{0B}$.

For example, the upstream pressure $p_G$ of the second diluting gas DG2 may be higher than or equal to 3000 mbar in order to ensure choked flow condition for the first modified aerosol flow FG1 in a predetermined range of inlet pressures $p_0$ from 940 mbar to 1060 mbar.

For example, the upstream pressure $p_G$ of the diluting gas DG2 may be higher than or equal to 3000 mbar in order to ensure choked flow condition for the first modified aerosol flow FG1 in a predetermined range of inlet pressures $p_0$ higher than or equal to 940 mbar.

FIG. 4a shows, by way of example, how the flow rate $m'_{FG0}$ of the primary sample gas FG0 may depend in a substantially linear manner on the inlet pressure $p_0$. This may indicate that the pressure ratio $p_E/p_0$ is low enough to ensure choked flow through the nozzle NOZ2a.

The flow rate $m'_{FG0}$ of the primary sample gas FG0 may be substantially independent of the upstream pressure $p_G$ of the second diluting gas DG2, in a situation where the pressure ratio $p_E/p_0$ is lower than the critical pressure ratio needed to ensure choked flow condition via the nozzle NOZ2a.

For example, the flow rate $m'_{FG0}$ of the primary sample gas FG0 caused by a first upstream pressure (e.g. $p_G$=3000 mbar) may be substantially equal to the flow rate $m'_{FG0}$ of the primary sample gas FG0 caused by a second upstream pressure (e.g. $p_G$=3500 mbar), in a situation where the pressure ratio $p_E/p_0$ is lower than the critical pressure ratio needed to ensure choked flow condition via the nozzle NOZ2a.

Figure 4B:
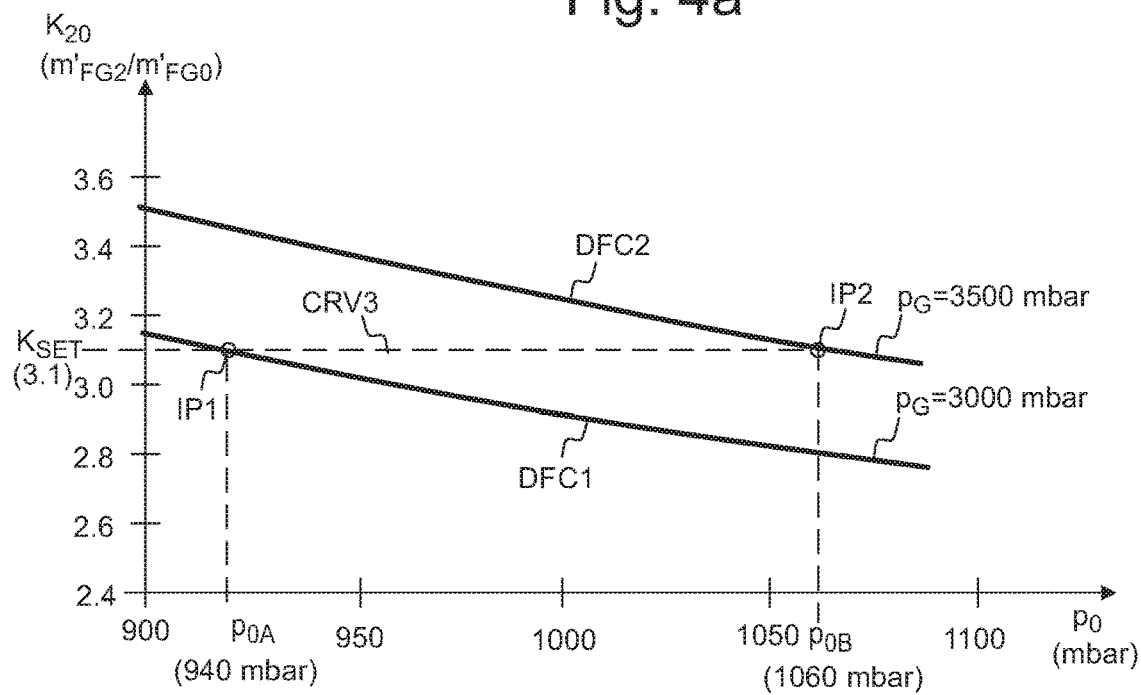

FIG. 4b shows, by way of example, a first dilution factor curve DFC1, which represents the dilution factor $K_{20}$ of the dilution device as the function of inlet pressure at a first upstream pressure (e.g. $p_G$=3000 mbar), and a second dilution factor curve DFC2, which represents the dilution factor $K_{20}$ of the dilution device as the function of inlet pressure at a second upstream pressure (e.g. $p_G$=3500 mbar).

The horizontal operating line CRV3 may represent a selected target value $K_{SET}$ of the dilution factor $K_{20}$. The horizontal line CRV3 may intersect the first dilution factor curve DFC1 at a first intersection point IP1. The horizontal line CRV3 may intersect the second dilution factor curve DFC2 at a second intersection point IP2.

The curves DFC1, DFC2 show that the dilution factor $K_{20}$ may depend in a substantially linear manner on the inlet pressure $p_0$, in a situation where the pressure ratio $p_E/p_0$ is lower than the critical pressure ratio needed to ensure choked flow through the nozzle NOZ2a.

Figure 4C:
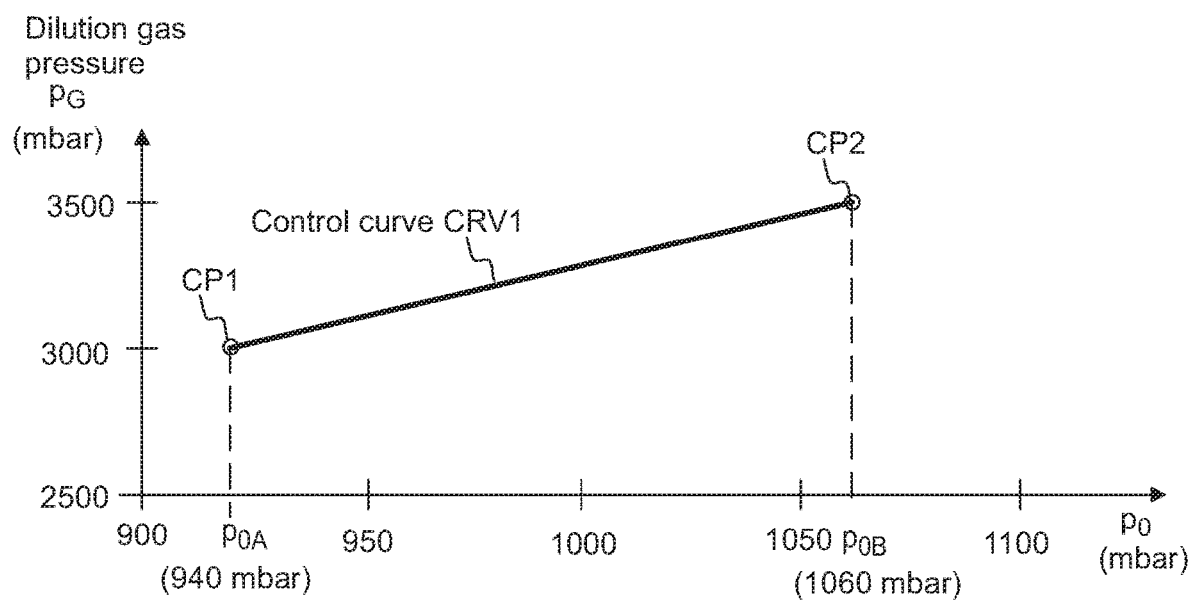

Referring to FIG. 4c, the diluting apparatus may comprise a pressure control unit, which may be arranged to adjust the upstream pressure $p_G$ as a function of the inlet pressure $p_0$, in order to keep the dilution factor $K_{20}$ substantially equal to a selected target value $K_{SET}$, in a situation where the inlet pressure $p_0$ varies within a predetermined range from a lower limit $p_{0A}$ to an upper limit $p_{0B}$. During operation, the operating point of the diluting device may be arranged to move e.g. along the horizontal operating line CRV3 shown in FIG. 4b. The horizontal line CRV3 may represent operation where the dilution factor $K_{20}$ is kept at the constant target value $K_{SET}$ by adjusting the upstream pressure $p_G$ as a function of the inlet pressure $p_0$, in a situation where the inlet pressure $p_0$ varies.

The pressure control unit may be arranged to adjust the upstream pressure $p_G$ e.g. as a linear control function $p_G(p_0)$ of the inlet pressure $p_0$. The control unit may be arranged to adjust the pressure $p_G$ e.g. according to a control function $p_G(p_0)$, which is represented by the control curve CRV1 of FIG. 4c, in order to keep the dilution factor $K_{20}$ equal to a selected constant value (e.g. $K_{SET}$=3.1). The control function $p_G(p_0)$ may be linear and may provide a first upstream pressure value (e.g. 3000 mbar) when the inlet pressure has a first value (e.g. 940 mbar). The control function $p_G(p_0)$ may provide a second upstream pressure value (e.g. 3500 mbar) when the inlet pressure has a second value (e.g. 1060 mbar).

A first intersection point IC1 may be determined by detecting where the first dilution factor curve DFC1 intersects the target dilution ratio $K_{SET}$. A second intersection point IC2 may be determined by detecting where the second dilution factor curve DFC2 intersects the target dilution ratio $K_{SET}$. A first control point CP1 (e.g. $p_0$=940 mbar, $p_G$=3000 mbar) may be determined by associating the inlet pressure value ($p_0$=940 mbar) of the first intersection point IP1 with the upstream pressure value (e.g. $p_G$=3000 mbar) of the first intersection point IP1. A second control point CP2 (e.g. $p_0$=1060 mbar, $p_G$=3500 mbar) may be determined by associating the inlet pressure value ($p_0$=1060 mbar) of the second intersection point IP2 with the upstream pressure value (e.g. $p_G$=3500 mbar) of the second intersection point IP2. A control function $p_G(p_0)$ for providing the selected dilution factor (e.g. $K_{SET}$=3.1) may be determined e.g. by fitting a control function $p_G(p_0)$ to the determined control points CP1, CP2.

The first dilution factor curve DFC1 includes the first intersection point IC1. The upstream pressure value of the first intersection point IC1 may mean the upstream pressure value of the first dilution factor curve DFC1. The upstream pressure value of the second intersection point IC2 may mean the upstream pressure value of the second dilution factor curve DFC2.

Referring back to FIG. 4a, adjusting the upstream pressure $p_G$ according to the inlet pressure $p_0$ may correspond to moving the operating point of the device 100 along the curve CRV2 of FIG. 4a.

FIG. 4a shows that the sample flow rate $m'_{FG0}$ may increase in a linear manner with increasing inlet pressure $p_0$. Increasing the upstream pressure $p_G$ according to the control curve CRV1 of FIG. 4c may simultaneously increase the flow rate $m'_{DG2}$ of the dilution gas DG2 so that the dilution factor $K_{20}$ may remain constant, in a situation where the inlet pressure $p_0$ is increased.

Referring to FIG. 5, the diluting apparatus 400 may comprise a diluting device 100, a control unit REGU1, and a control valve VAL1. The diluting device 100 may provide a diluted second modified aerosol flow FG2 for the measuring instrument INSTR1, by adding diluting gas GAS0 to the primary aerosol sample flow FG0. The particle-free diluting gas GAS0 may be provided as a total dilution gas flow DG0. The total dilution gas flow DG0 may be divided to form the first dilution gas flow DG1 and the second dilution gas flow DG2.

The combination of the control unit REGU1 and the control valve VAL1 may be arranged to adjust the flow rate of a diluting gas flow DG0, DG1, and/or DG2 according to the inlet pressure $p_0$. The inlet pressure $p^0(t)$ may vary as a function of time t. The control unit REGU1, and the valve VAL1 may control an upstream pressure $p_G$ of the diluting gas GAS0 according to the inlet pressure $p_0$ of the sample flow FG0 of the diluting device 100. The control unit REGU1 may control operation of the valve VAL1 based on a pressure signal S0 obtained from a first pressure sensor M0. The diluting apparatus 400 may comprise a first pressure sensor M0 for providing the pressure signal S0 indicative of the inlet pressure $p_0$. Alternatively, or in addition, the apparatus 400 may comprise an input for receiving the pressure signal S0 e.g. from a process control system of an industrial process.

A measuring apparatus 500 may comprise the diluting apparatus 400 and a measuring instrument INSTR1. The measuring apparatus 500 may be arranged to measure aerosol particles generated by an aerosol source SRC1. The aerosol source SRC1 may generate an original aerosol flow PG0. The original aerosol flow PG0 may comprise aerosol particles suspended in a gas. The original aerosol flow PG0 generated by the source SRC1 may be guided via a duct DUC1. The original aerosol flow PG0 generated by the source SRC1 may be contained e.g. in a vessel or duct DUC1.

The diluting apparatus 400 may obtain the primary aerosol sample flow FG0 by sampling the original aerosol flow PG0. The apparatus 400 may comprise a sampling line 610 for guiding the primary aerosol sample flow FG0 to the diluting device 100. The sampling line 610 may comprise one or more sampling orifices 612 for drawing the primary aerosol sample flow FG0 from the original aerosol flow PG0 to the sampling line 610.

A measurement set up 1000 may comprise the aerosol source SRC1 and the measuring apparatus 500. The source SRC1 may be e.g. an internal combustion engine of an automobile. The source SRC1 may be e.g. a combustion facility. The original aerosol flow PG0 generated by the source SRC1 may be guided via a duct DUC1. The duct DUC1 may be e.g. an exhaust gas tube of a vehicle or a stack of a combustion facility.

The primary sample flow FG0 may carry aerosol particles suspended in a gas. The particles may be e.g. solid or liquid particles. The size of the aerosol particles may be e.g. in the range of 5 nm to 50 µm.

The dilution may e.g. reduce or prevent loss of aerosol particles. The dilution may e.g. reduce or prevent unwanted chemical alteration of the sample. The dilution may e.g. reduce or prevent contamination of the measuring instrument INSTR1.

The diluting device 100 may be arranged to operate such that the size distribution of the aerosol particles of the second modified aerosol sample FG2 may be substantially similar to the size distribution of the aerosol particles of the primary aerosol sample FG0. In particular, the diluting device 100 may maintain the shape of the size distribution for particles which are e.g. in the range of 50 nm to 2.5 µm.

The diluting apparatus 400 may be arranged to operate such that the size distribution of the aerosol particles of the second modified aerosol sample FG2 may be substantially similar to the size distribution of the aerosol particles of the original aerosol flow PG0, for particles which are e.g. in the range of 50 nm to 2.5 µm.

The original aerosol flow PG0 may comprise volatile compounds in addition to the aerosol particles. The diluting apparatus 400 may be arranged to dilute the sample flow and/or to control the temperature dilute the sample flow such that premature condensation of the volatile compounds in the apparatus 400 may be reduced or avoided.

The flow patterns caused by the nozzles and the ducts of the diluting device 100 may reduce or minimize mass transfer from the sample flow to the internal surfaces of the diluting device 100.

The original aerosol sample flow FG0 may be guided from the duct DUC1 by using the sampling line 610. The original aerosol sample flow FG0 may be diluted by using the diluting device 100. The diluting device 100 may provide a diluted modified second sample flow FG2, which may be subsequently analyzed by using the aerosol measuring instrument INSTR1.

The aerosol measuring instrument INSTR1 may be arranged to measure aerosol concentration e.g. in real time. The aerosol measuring instrument INSTR1 may be arranged to measure aerosol concentration by a batch measurement, e.g. by collecting aerosol particles to a filter and by weighing the filter.

The measuring apparatus 500 may comprise an aerosol measuring instrument INSTR1. The aerosol measuring instrument INSTR1 may comprise e.g. a filter for collecting aerosol particles, wherein the total mass of the collected aerosol particles may be measured by weighing the filter. The aerosol measuring instrument INSTR1 may comprise e.g. a mobility spectrometer to measure particle size distribution. The aerosol measuring instrument INSTR1 may comprise e.g. an electrical low-pressure impactor (ELPI) to measure aerosol concentration in real time.

The duct DUC1 may have a varying internal pressure. The primary sample flow FG0 may have a varying pressure $p_0$ at the inlet 101 of the diluting device 100. The flow rate of the diluting gas may be adjusted according to the varying inlet pressure $p_0$, so as to keep the dilution factor substantially constant e.g. in a situation where the inlet pressure $p_0$ is changed from a first value to a second different value.

The diluting apparatus 400 may comprise a first pressure sensor M0 to monitor the inlet pressure $p_0$. The sensor M0 may provide a pressure signal S0 indicative of the inlet pressure $p_0$ of the primary aerosol sample FG0. The first sensor M0 may be arranged to monitor e.g. the pressure of the inlet 101 of the diluting device 100.

In an embodiment, the inlet pressure $p_0$ may be substantially equal to the pressure of the duct, equal to the sampling line, or equal to an internal pressure of the first diluting unit DU1. The first sensor M0 may be arranged to monitor e.g. an internal pressure of the duct DUC1, an internal pressure of the sampling line 610, and/or an internal pressure of the first diluting unit DU1. The inlet pressure $p_0$ may be determined from a measured pressure of the duct, from a measured pressure of the sampling line, or from a measured internal pressure of the first diluting unit DU1.

In an embodiment, the inlet pressure $p_0$ may be substantially equal to the pressure of the first gas distribution space 110. The inlet pressure $p^0$ may be measured e.g. by measuring the pressure of the space 110. The first pressure sensor M0 may be arranged to measure the pressure of the first gas distribution space 110 e.g. in order to reduce or avoid contamination of the first pressure sensor M0.

The diluting apparatus 400 may comprise a control unit REGU1 and a control valve VAL1 to adjust upstream pressure $p_G$ of diluting gas DG1 and/or DG2 as a function (see curve CRV1 in FIG. 4c) of the inlet pressure $p_0$. The valve VAL1 may be controlled by the control unit REGU1. The control unit REGU1 may provide a control signal $S_{VAL1}$ to the valve VAL1 based on the measured pressure signal S0, and the valve VAL1 may adjust the upstream pressure $p_G$ of the diluting gas according to the control signal $S_{VAL1}$ obtained from the control unit REGU1.

The diluting apparatus 400 may optionally comprise a second pressure sensor M1 to monitor the upstream pressure $p_G$ of the dilution gas DG1 and/or DG2. The second pressure sensor M1 may provide a signal S1 indicative of the pressure $p_G$ of the dilution gas. The second pressure sensor M1 may facilitate more accurate adjustment of the pressure $p_G$. The control unit REGU1 may provide a control signal $S_{VAL1}$ to the valve based on the measured pressure signals S0, S1. The valve VAL1 may restrict the flow of diluting gas GAS0, in order to adjust the upstream pressure $p_G$ of the diluting gas according to the control signal $S_{VAL1}$ obtained from the control unit REGU1. The control unit REGU1 and the valve VAL1 may be arranged to adjust the pressure $p_G$ of the diluting gas based on the signal S0. The control unit REGU1 and the valve VAL1 may be arranged to adjust the pressure $p_G$ of the diluting gas based on the signals S0, S1.

In an embodiment, the control unit REGU1 may comprise a computer readable memory MEM1 for storing the parameters of a control function. The control unit REGU1 may comprise a data processor PROC1 to form one or more control signals $S_{VAL1}$ from the inlet pressure $p_0$ according to the control function defined by the parameters stored in the memory MEM1.

The first diluting gas flow DG1 may be combined with the sample flow in the first diluting unit DU1. The apparatus 400 may comprise a first critical orifice CR1 to regulate the flow rate $m'_{DG1}$ of the first diluting gas flow DG1 according to the upstream pressure $p_G$ of the diluting gas flow. The pressure $p_G$ may denote the upstream pressure of the first critical orifice CR1.

The second diluting gas flow DG2 may be mixed with the modified sample flow in the second diluting unit DU2. The apparatus 400 may comprise a second critical orifice CR2 to regulate the flow rate $m'_{DG2}$ of the second diluting gas flow DG2 according to the upstream pressure $p_G$ of the diluting gas flow. The pressure $p_G$ may denote the upstream pressure of the second critical orifice CR2.

The apparatus 400 may be arranged to adjust the upstream pressures of the critical orifices CR1, CR2 according to the inlet pressure $p_0$, so as to maintain the dilution factor $K_{20}$ of the diluting device 100 substantially constant in a situation where the inlet pressure $p_0$ is changed from a first value to a second different value.

The first critical orifice CR1 and/or the second critical orifice CR2 may be arranged to provide a choked flow condition, i.e. a situation where the gas flow rate through the orifice is independent of the downstream pressure of the critical orifice. The choked flow condition may be attained when the ratio of downstream pressure of the orifice to the upstream pressure of the orifice is lower than or equal to the critical pressure ratio. The critical pressure ratio may depend on the specific heat ($c_p$) of the flowing fluid at constant pressure and on the specific heat ($c_v$) of the flowing fluid at constant volume. The critical pressure ratio is typically in the range of 0.52 to 0.55. For example, the critical pressure ratio for nitrogen, oxygen and air is 0.528. For example, the critical pressure ratio for carbon dioxide is 0.546.

The apparatus 400 may be arranged to operate such that the ratio of downstream pressure of the orifice CR2 to the upstream pressure of the orifice CR2 is lower than or equal to 0.50.

The control unit REGU1 and the valve VAL1 may be arranged to adjust the upstream pressure $p_G$ of the critical orifices CR1, CR2. The valve VAL1 may be arranged to adjust the upstream pressure $p_G$ of the critical orifices CR1, CR2 such that the ratio of downstream pressure of the orifice CR2 to the upstream pressure of the orifice CR2 is lower than or equal to 0.50 during operation of the diluting device.

The apparatus 400 may be arranged to operate such that the ratio of downstream pressure of the orifice CR2 to the upstream pressure of the orifice CR2 is even lower than 0.33 during operation of the diluting device, in order to ensure choked flow condition for inlet pressures $p_0$ which are e.g. in the range of 900 mbar to 1100 mbar.

Dilution gas GAS0 or heated dilution gas HGAS0 may be guided to one or more orifices CR1 and/or CR2 e.g. via a duct 210. The pressurized dilution gas GAS0 or HGAS0 may be distributed to the orifices CR1, CR2 e.g. via the duct 210.

The apparatus 400 may comprise e.g. a needle valve or an orifice plate to provide the critical orifice CR1, CR2. In particular, an opening 115 formed in a part of the device 100 may be arranged to operate as the first critical orifice CR1 (see FIG. 6a). In particular, an injection nozzle NOZ2b of the ejector unit may be arranged to operate as the second critical orifice CR2 (see FIGS. 6a and 6b).

The apparatus 400 may comprise a dilution gas source GS1 to provide substantially particle free pressurized dilution gas to the valve VAL1. The dilution gas source GS1 may be e.g. a pressurized gas cylinder. The dilution gas source GS1 may comprise e.g. an air filter, a pump and/or a dehumidifier to provide substantially particle free dilution gas GAS0.

The apparatus 400 may optionally comprise a heater unit HEAT1 to provide heated diluting gas HGAS0 by heating substantially particle-free gas GAS0. The heater unit HEAT1 may provide heated diluting gas HGAS0 by heating diluting gas GAS0. The heater unit HEAT1 may receive pressurized diluting gas GAS0 from the pressure regulating valve VAL1. The heated pressurized diluting gas HGAS0 may be guided to the diluting device 100. The heated diluting gas HGAS0 may be distributed to the diluting units DU1, DU2.

The heater unit HEAT1 may receive gas from the control valve VAL1. In that case, the valve does not need to withstand high temperatures. Alternatively, the heater unit HEAT1 may provide heated gas to the control valve VAL1.

The temperature of the heated diluting gas HGAS0 may be higher than a predetermined value, in order to reduce or avoid premature condensation. The temperature of the heated diluting gas HGAS0 may be e.g. substantially equal to the temperature of the original aerosol flow PG0 in the duct DUC1. The temperature of the heated gas HGAS0 may be e.g. higher than or equal to the temperature of the original aerosol flow PG0 in the duct DUC1.

The temperature of the heated gas HGAS0 may be e.g. in the range of 50° C. to 450° C.

The temperature of the original aerosol flow PG0 in the duct DUC1 may be e.g. in the range of 50° C. to 450° C., and the temperature of the heated gas HGAS0 may be e.g. higher than or equal to the temperature of the original aerosol flow PG0.

The temperature of the original aerosol flow PG0 in the duct DUC1 may be e.g. in the range of 50° C. to 100° C., in the range of 100° C. to 200° C., or even in the range of 200° C. to 450° C. The temperature of the heated gas HGAS0 may be e.g. higher than or equal to the temperature of the original aerosol flow PG0.

The temperature of the original aerosol flow PG0 in the duct DUC1 may be e.g. substantially equal to 80° C., wherein temperature of the heated dilution gas HGAS0 may be e.g. in the range of 80° C. to 150° C.

The apparatus 400 may comprise a heater and/or heat insulation to keep the sample line 610 and/or the diluting device 100 at an elevated temperature.

The flow of the second diluting gas DG2 may be temporarily reduced or stopped e.g. in order to stop or reverse the direction of flow in the sampling line. The first diluting gas DG1 guided to the first diluting unit DU1 during said reducing or stopping may protect the sampling line from contamination. The first diluting gas DG1 guided to the first diluting unit DU1 during said reducing or stopping may flush the sampling line from contamination. The ratio m'$_{DG1}$/m'$_{DG2}$ of the flow rates may be temporarily increased in order to protect the diluting device and/or the sampling line. The apparatus may comprise e.g. a magnetic valve to temporarily stop the second diluting gas flow DG2 in order to flush and/or protect the device 100. The apparatus may comprise e.g. a magnetic valve to temporarily increase the flow rate of the first diluting gas flow DG1, in order to flush and/or protect the device 100.

The aerosol measuring instrument INSTR1 may provide one or more measurement results RES1($t$). The measurement result RES1($t$) may indicate e.g. concentration of aerosol particles, total mass of aerosol particles, particle size distribution of aerosol particles, and/or composition of aerosol particles. The measurement result RES1 may be obtained e.g. as a function RES1($t$) of time t.

The aerosol source SRC1 may be e.g. an internal combustion engine. The engine may use e.g. gasoline, diesel oil, alcohol and/or combustible gas as the fuel. The source SRC1 may optionally provide a process indicator signal PAR1($t$). The measurement result RES1($t$) of the measuring instrument INSTR1 may be compared with the process indicator signal PAR1($t$) in order to determine whether a change of an operating parameter of the particle source SRC1 corresponds to a change of the measured result RES1($t$). The result RES1($t$) may be compared with the process indicator signal PAR1($t$) in order to determine whether the result RES1($t$) correlates with the process indicator signal PAR1($t$). The process indicator signal PAR1($t$) may be e.g. indicative of fuel flow rate, input air flow rate to an engine, operating temperature of an engine, operating temperature of a cylinder of an engine, operating temperature of a catalytic converter, operating temperature of a filter, operating temperature of a process, gas pedal setting, valve timing of an engine, fuel feeding pressure, rotation speed of a dynamometer coupled to the engine, torque of an engine, power transferred from an engine to a dynamometer, or flow rate of an additive. The aerosol particle source SRC1 may simultaneously provide a plurality of process indicator signals, which may be indicative of different operating parameters of the source SRC1.

The diluting method and/or apparatus may be used when performing aerosol measurements, e.g. for determining whether aerosol emissions from an engine SCR1 of a vehicle comply with the requirements defined in the Euro V, Euro V+ or Euro VI standard of the European Union.

The source SRC1 may also be e.g. a combustion furnace, an incineration furnace, a fluidized bed boiler, an industrial process unit, or a gas turbine. The gas duct DUC1 may be e.g. a flue gas duct of a combustion facility.

The process indicator signals PAR1($t$) and the measurement results RES1($t$) may be stored in a memory. The measurement results RES1($t$) may be analyzed e.g. in order to determine whether average aerosol concentration in the duct DUC1 is lower than a predetermined limit. The measurement results RES1($t$) may be analyzed e.g. in order to determine whether average aerosol concentration in the duct DUC1 complies with official regulations. The measurement results RES1($t$) may be analyzed e.g. in order to determine whether there is a significant correlation between a process indicator signal PAR1($t$) and the measurement result RES1($t$). The measurement results RES1($t$) may be utilized e.g. in order to optimize one or more operating parameters of the engine SRC1.

The apparatus 400 may comprise a pressure equalizer unit 300 to maintain the pressure $p_2$ of the diluted sample flow substantially equal to the ambient pressure $p_A$. The pressure equalizer unit 300 to maintain the pressure $p_2$ of the diluted sample flow e.g. substantially equal to the pressure 1000 mbar. The pressure $p_2$ may be maintained e.g. at 1013 mbar.

The equalizer 300 may receive the second modified flow FG2 to an input port 301, and the equalizer 300 may distribute the second modified flow FG2 to two or more output ports 311, 312. The equalizer 300 may provide a first partial flow FG2A via the first port 311, and the equalizer 300 may provide a second partial flow FG2B via the second port 312. The first partial flow FG2A may be guided to the aerosol measuring instrument INSTR1. The second partial flow FG2B may be vented to the ambient pressure $p_A$ via the second port 312, so as to maintain the pressure $p_2$ of the diluted sample flow substantially equal to the ambient pressure $p_A$. The second partial flow may be called e.g. as a residual flow. The second partial flow may be e.g. discharged to the ambient air, discharged to an ambient room air, or discharged to an inlet of a ventilation system. The original aerosol PG0 may sometimes comprise environmentally harmful components, and the ventilation system may optionally comprise e.g. a filter to remove the harmful components.

Aerosol measurement result RES1 obtained from the measuring instrument INSTR1 may be used e.g. for checking whether the mass concentration of aerosol particles in the exhaust gas of an internal combustion engine SRC1 is lower than a predetermined limit.

Aerosol measurement result RES1 obtained from the measuring instrument INSTR1 may be used e.g. for checking whether the emission of aerosols from an engine complies with a predetermined limit value. The predetermined limit value may be defined e.g. in an official regulation, e.g. in a standard of the European Union.

Figure 6B:
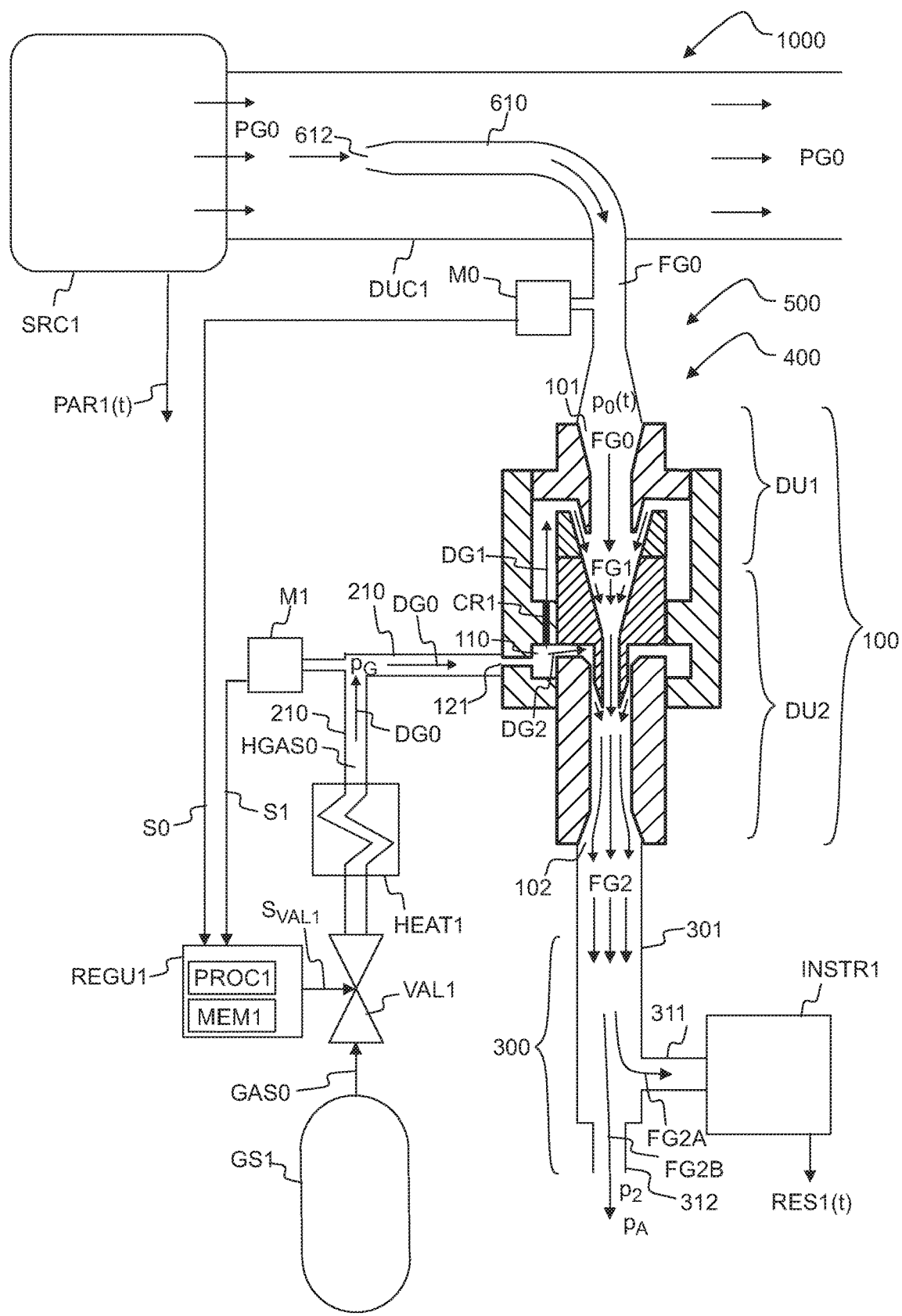

Referring to FIGS. 6a and 6b, the injection nozzle NOZ2*b* of the ejector unit DU2 may be arranged to operate as the critical orifice CR2, to regulate the flow rate of the second diluting gas DG2. The diluting device 100 may comprise an opening 115, which may be arranged to operate as the first critical orifice CR1, to regulate the flow rate of the first diluting gas DG1. The opening 115 may e.g. provide a fluid connection between the first and second gas distributing spaces 110 and 120. The opening 115 may be arranged to operate as the first critical orifice CR1 for the flow DG1.

The diluting device 100 may comprise a single inlet 121 for guiding dilution gas GAS0, HGAS0 to the second distributing space 120. The first dilution gas flow FG1 may be guided from the second distributing space 120 to the first distributing space 110 via the opening 115. The second dilution gas flow FG2 may be guided from the second distributing space 120 to the mixing region of the ejector unit DU2 via the nozzle NOZ2b. The opening 115 may operate as the first critical orifice CR1 for the first diluting gas flow DG1. The nozzle NOZ2b may operate as the second critical orifice CR2 for the second diluting gas flow DG2. Using the internal opening and/or nozzle to regulate the flow rates may provide a simple, rugged and stable diluting device 100. The valve VAL1 may adjust the upstream pressure $p_G$ of the orifices 115, NOZ2.

The flow rate $m'_{FG1}$ of the first modified sample flow FG1 may be equal to the sum of the flow rate $m'_{FG0}$ of the primary sample flow FG0 and flow rate $m'_{DG1}$ of the first diluting gas flow DG1.

$$m'_{FG1} = m'_{FG0} + m'_{DG1} \quad (1a)$$

The flow rate $m'_{FG2}$ of the second modified sample flow FG2 may be equal to the sum of the flow rate $m'_{FG0}$ of the primary sample flow FG0, the flow rate $m'_{DG1}$ of the first diluting gas flow DG1, and the flow rate $m'_{DG2}$ of the second diluting gas flow DG2.

$$m'_{FG2} = m'_{FG0} + m'_{DG1} + m'_{DG2} \quad (1b)$$

The dilution factor $K_{10}$ of the first diluting unit DU1 may be defined as follows:

$$K_{10} = \frac{m'_{FG1}}{m'_{FG0}} \quad (2a)$$

or by the following equation:

$$K_{10} = \frac{m'_{FG0} + m'_{FG1}}{m'_{FG0}} \quad (2b)$$

The dilution factor $K_{21}$ of the second diluting unit DU2 may be defined as follows:

$$K_{21} = \frac{m'_{FG2}}{m'_{FG1}} \quad (2c)$$

or by the following equation:

$$K_{21} = \frac{m'_{FG1} + m'_{DG2}}{m'_{FG1}} \quad (2d)$$

The total dilution factor $K_{20}$ of the diluting device 100 may be defined as follows:

$$K_{20} = \frac{m'_{FG0} + m'_{DG1} + m'_{DG2}}{m'_{FG0}} \quad (2e)$$

The total dilution factor $K_{20}$ of the diluting device 100 may be equal to the dilution factor $K_{10}$ of the first diluting unit DU1 multiplied by the dilution factor $K_{21}$ of the second diluting unit DU2.

$$K_{20} = K_{10} \cdot K_{21} \quad (2f)$$

The pressure difference caused by the first diluting unit DU1 may be so low that the intermediate pressure $p^1$ between the diluting units DU1, DU2 is substantially equal to the inlet pressure $p_0$.

$$p_1 = p_0 \quad (3a)$$

The apparatus may be arranged to operate such that the flow rate m'DG1 of the first diluting gas flow DG1 is adjusted as a function $f_{DG1}$ of the inlet pressure $p_0$.

$$m'_{DG1} = f_{DG1}(p_0) \quad (3b)$$

The apparatus may be arranged to operate such that the flow rate $m'_{DG2}$ of the second diluting gas flow DG2 is adjusted as a function $f_{DG2}$ of the inlet pressure $p_0$.

$$m'_{DG2} = f_{DG2}(p_0) \quad (3c)$$

The diluting apparatus 400 may be arranged to adjust the flow rate $m'_{DG1}$ of the first diluting gas flow DG1 and the flow rate $m'_{DG2}$ of the second diluting gas flow DG2 according to the inlet pressure $p_0$ such that the total dilution factor $K_{20}$ of the diluting device 100 may remain substantially equal to a selected target value ($K_{SET}$), in a situation where the inlet pressure $p_0$ is varies.

The operating stability of the diluting apparatus may be improved by selecting the dimensions of the nozzles NOZ2a, NOZ2b and the upstream pressure $p_G$ such that the first modified aerosol sample flow FG1 through the nozzle NOZ2a is choked.

The choked first modified flow FG1 may provide a linear relationship between the inlet pressure $p_0$ and the flow rate $m'_{FG1}$ of the modified sample flow FG1. The linear relationship between the inlet pressure $p_0$ and the flow rate $m'_{FG1}$ may also provide a linear relationship between the inlet pressure $p_0$ and the flow rate $m'_{FG0}$ of the primary sample aerosol flow FG0, in a situation where the flow rate $m'_{DG1}$ of the first diluting gas DG1 is adjusted as a linear function of the inlet pressure $p_0$.

The second diluting gas flow DG2 injected to the mixing region MIX2 of the ejector unit DU2 may create a partial local vacuum in the mixing region MIX2. The pressure $p_E$ may denote minimum pressure of the ejector unit DU2, at the exit of the nozzle NOZ2a. Choked flow may occur in the nozzle NOZ2a of the ejector unit DU2 due to the pressure difference ($p_1$-$p_E$) over the nozzle NOZ2a. Choked flow may occur in the nozzle NOZ2a when the ratio $p_E/p_1$ is lower than the critical pressure ratio. $p_1$ denotes the pressure of the first modified sample flow FG1 at a spatial location where first modified sample flow FG1 has maximum pressure. The first modified aerosol sample flow FG1 may have the maximum pressure $p_1$ at a point, which is located between the nozzles NOZ1a and NOZ2a.

When the choked flow occurs in the nozzle NOZ2a, then the flow rate $m'_{FG1}$ of the first modified aerosol sample flow FG1 may be proportional to the pressure $p^1$ of the first modified aerosol sample flow FG1. The flow rate $m'_{FG1}$ of the first modified sample flow FG1 may depend on the pressure $p_1$ e.g. according to the following equation:

$$m'_{FG1} = \frac{C_{2A}A_{2A}p_1}{\sqrt{T_1}} \quad (4a)$$

$C_{2A}$ denotes a proportionality constant, $A_{2A}$ denotes cross-sectional area of the orifice of the nozzle NOZ2a, $p_1$ denotes the maximum pressure of the first modified sample flow FG1, and $T_1$ denotes the temperature of the first modified sample flow FG1 at the nozzle NOZ2a. The constant $C_{2A}$ may depend on the geometrical shape of the nozzle NOZ2a.

When choked flow occurs in the first critical orifice CR1, then the flow rate $m'_{DG1}$ of the first diluting gas flow DG1 may be proportional to the upstream pressure of the first diluting gas flow. The flow rate $m'_{DG1}$ of the first diluting gas flow DG1 may depend on the upstream pressure $p_G$ e.g. according to the following equation:

$$m'_{DG1} = \frac{C_{CR1}A_{CR1}p_{CR1}}{\sqrt{T_{CR1}}} \quad (4b)$$

$C_{CR1}$ denotes a proportionality constant, $A_{CR1}$ denotes cross-sectional area of the orifice of the first critical orifice CR1, $p_{CR1}$ denotes the upstream pressure of the first critical orifice CR1, and $T_{CR1}$ denotes gas temperature at the first critical orifice CR1. The constant $C_{CR1}$ may depend on the geometrical shape of the first critical orifice CR1.

When choked flow occurs in the second critical orifice CR2, then the flow rate $m'_{DG2}$ of the second diluting gas flow DG2 may be proportional to the upstream pressure of the first diluting gas flow. The flow rate $m'_{DG2}$ of the second diluting gas flow DG2 may depend on the upstream pressure $p_G$ e.g. according to the following equation:

$$m'_{DG2} = \frac{C_{CR2}A_{CR2}p_{DG2}}{\sqrt{T_{DG2}}} \quad (4c)$$

$C_{CR2}$ denotes a proportionality constant, $A_{CR2}$ denotes cross-sectional area of the orifice of the first critical orifice CR2, $p_{CR2}$ denotes the upstream pressure of the second critical orifice CR2, and $T_{CR2}$ denotes gas temperature at the second critical orifice CR2. The constant $C_{CR2}$ may depend on the geometrical shape of the second critical orifice CR2.

The values $C_{2A}$, $A_{2A}$, $C_{CR1}$, $A_{CR1}$, $C_{CR2}$, $A_{CR2}$ may be constant. The apparatus may be arranged to operate such that the temperatures $T_1$, $T_{CR1}$, $T_{CR2}$ are substantially constant.

The upstream pressure of the critical orifice CR1 and/or CR2 may be adjusted e.g. as a linear function of the inlet pressure $p_0$.

Based on equation (4b), the flow rate $m'_{DG1}$ of the first diluting gas flow DG1 may be a linear function of the inlet pressure $p_0$, in a situation where the upstream pressure of the first critical orifice CR1 is a linear function of the inlet pressure $p_0$.

Based on equation (4c), the flow rate $m'_{DG2}$ of the second diluting gas flow DG2 may be a linear function of the inlet pressure $p_0$, in a situation where the upstream pressure of the second critical orifice CR2 is a linear function of the inlet pressure $p_0$.

Based on equations (3a) and (4a), the flow rate $m'_{FG1}$ of the first modified sample flow FG1 may be a linear function of the inlet pressure $p_0$. Based on equation (1a), also the flow rate $m'_{FG0}$ of the primary sample flow FG0 may be a linear function of the inlet pressure $p_0$, in a situation where the first dilution gas flow DG1 is choked, and the upstream pressure of the first critical orifice CR1 is adjusted as a linear function of the inlet pressure $p_0$.

The flow rate $m'_{FG0}$ of the primary sample flow FG0 may be determined from the detected inlet pressure value $p_0$, e.g. based on the above-mentioned linear relationship. The diluting apparatus 400 may be arranged to operate such that the flow rate $m'_{FG0}$ of the primary sample flow FG0 is not measured. The apparatus 400 may be arranged to operate such that the flow rate $m'_{FG0}$ of primary sample flow FG0 is not directly measured. The apparatus 400 may be arranged to operate such that it is not necessary to measure the flow rate $m'_{FG0}$. Consequently, loss of aerosol particles to a flow measurement sensor may be avoided.

The flow rate $m'_{FG0}$ of the primary sample flow FG0 drawn to the diluting device 100 may increase with increasing inlet pressure $p_0$, as a linear function of the inlet pressure $p_0$. The flow rate $m'_{DG1}$ of the first diluting gas flow DG1 may be arranged to increase with increasing inlet pressure $p_0$, as a linear function of the inlet pressure $p_0$. The flow rate m'DG2 of the second diluting gas flow DG2 may be arranged to increase with increasing inlet pressure $p_0$, as a linear function of the inlet pressure $p_0$. The dilution factor $K_{20}$ of the device 100 is defined by the equation (2e). Referring to the discussion above, all flow rates $m'_{FG0}$, $m'_{DG1}$, $m'_{DG2}$ appearing in the definition of the dilution factor $K_{20}$ may increase with increasing inlet pressure $p_0$. The control functions for adjusting the flow rates $m'_{DG1}$, $m'_{DG2}$ according to the inlet pressure $p_0$ may be selected so as to keep the dilution factor $K_{20}$ of the device 100 substantially independent of the inlet pressure $p_0$. In particular, the upstream pressure of the critical orifices CR1, CR2 may be adjusted as a linear function of the inlet pressure $p_0$ so as to keep the dilution factor $K_{20}$ of the device 100 substantially independent of the inlet pressure $p_0$.

The control unit REGU1 and the valve VAL1 may be arranged to operate such that the upstream pressure $p_G$ of the critical orifices CR1, CR2 is adjusted as a function of the inlet pressure $p_0$ so as to keep the difference between the dilution factor $K_{20}$ and a target value $K_{SET}$ smaller than a predetermined limit in a situation where the inlet pressure $p_0$ varies in a predetermined range (e.g. in the range of 900 mbar to 1100 mbar).

The apparatus 400 may be arranged to adjust the upstream pressures $p_{CR1}$ and $p_{CR2}$ separately. However, the apparatus 400 may be simplified by using the same control valve VAL1 for simultaneously adjusting the pressures $p_{CR1}$ and $p_{CR2}$. The pressure $p_G$ may mean the common upstream pressure of the critical orifices CR1, CR2.

The control unit REGU1 and the valve VAL1 may be arranged to adjust the pressure $p_G$ of the dilution gas HGAS0 as a function of the inlet pressure $p_0$.

In particular, the control unit REGU1 and the valve VAL1 may be arranged to operate such that the upstream pressure $p_G$ of the critical orifices CR1, CR2 is adjusted according to a linear function of the inlet pressure $p_0$.

In particular, the upstream pressure $p_G$ of the critical orifices CR1, CR2 may be adjusted as a linear function of the inlet pressure $p_0$ according to the following equation:

$$p_G(p_0) = a_0 \cdot p_0(t) + b_0 \quad (5)$$

The constants $a_0$ and $b_0$ may be selected such that the dilution factor $K_{20}$ ($=m'_{FG2}/m'_{FG0}$) of the diluting device 100 is substantially independent of the inlet pressure $p_0$. The inlet pressure $p_0(t)$ may vary as a function of time t.

Referring back to FIG. 4b, the constants $a_0$ and $b_0$ may be selected e.g. by a method, which comprises obtaining a first dilution factor curve DFC1, which represents the dilution factor $K_{20}$ of the diluting device as a function of the inlet pressure $p_0$ in a situation where the upstream pressure $p_G$ has a first value (e.g. 3000 mbar), and obtaining a second dilution factor curve DFC2, which represents the dilution factor of the diluting device as a function of the inlet pressure in a situation where the upstream pressure has a second different value (e.g. 3500 mbar). The method may comprise determining a first intersection point IP1 where the first dilution factor curve DFC1 intersects a line CRV3, which represents the selected target value (e.g. $K_{SET}$=3.1). The method may comprise determining a second intersection point IP2 where the second dilution factor curve DFC2 intersects said line CRV3. A first control point CP1 (e.g. $p_0$=940 mbar, $p_G$=3000 mbar) may be determined by associating the inlet pressure value ($p_0$=940 mbar) of the first intersection point IP1 with the upstream pressure value (e.g. $p_G$=3000 mbar) of the first intersection point IP1. A second control point CP2 (e.g. $p_0$=1060 mbar, $p_G$=3500 mbar) may be determined by associating the inlet pressure value ($p_0$=1060 mbar) of the second intersection point IP2 with the upstream pressure value (e.g. $p_G$=3500 mbar) of the second intersection point IP2. The method may comprise determining the constants $a_0$ and $b_0$ e.g. by fitting the function of equation (5) to the control points CP1, CP2.

The method may comprise determining the control function $p_G(p_0)$ e.g. by obtaining two or more dilution factor curves DFC1, DFC2, selecting a target dilution factor $K_{SET}$, determining two or more intersection points IP1, IP2, determining two or more control points CP1, CP2 from the intersection points IP1, IP2, and by fitting the control function $p_G(p_0)$ to the control points CP1, CP2.

The method may comprise determining the control function $p_G(p_0)$ e.g. by obtaining three or more dilution factor curves, selecting a target dilution factor $K_{SET}$, determining three or more intersection points, determining three or more control points from the intersection points, and by fitting a control function $p_G(p_0)$ to the control points. Determining the control function $p_G(p_0)$ by using three or more dilution factor curves may further improve accuracy for keeping the dilution factor constant at various inlet pressure values $p_0$.

The dilution factor $K_{20}$ of the diluting device 100 may be substantially independent of inlet pressure $p_0$, in a situation where the upstream gas pressure $p_G$ of the diluting gas is adjusted as a substantially linear function of the inlet pressure $p_0$, and wherein the pressure $p_2$ at the outlet 102 of the diluting device 100 is kept substantially constant.

The dilution factor $K_{20}$ of the diluting device 100 may be e.g. in the range of 98% to 102% of a target value $K_{SET}$, in a situation where the inlet pressure $p_0$ is varied in the range of 900 mbar to 1100 mbar, wherein the outlet pressure $p_2$ at the outlet 102 of the diluting device 100 is varied in the range of 1000 mbar to 1020 mbar.

The dilution factor $K_{20}$ may be selectable. The dilution factor $K_{20}$ may be selectable within a certain range. The dilution factor $K_{20}$ may be selectable e.g. from the range of 3.0 to 25. The dilution factor $K_{20}$ may be selected e.g. by selecting the control functions $f_{DG1}(p_0)$, $f_{DG2}(p_0)$, see equations (3b), (3c) above.

The method may comprise adjusting the flow rate ($m'_{DG1}$) of the first dilution gas flow (FG1) according to first control function ($f_{1,DG1}(p_0)$) of the inlet pressure ($p_0$), and adjusting the flow rate ($m'_{DG2}$) of the second dilution gas flow (DG2) according to second control function ($f_{2,DG2}(p_0)$) of the inlet pressure ($p_0$) so as to keep the dilution factor ($K_{20}$) substantially equal to a first selected value ($K_{SET,1}$). The control functions ($f_{1,DG1}(p_0)$, $f_{2,DG2}(p_0)$) may be e.g. linear functions. The total flow rate of the dilution gas may be adjusted according to the sum of the functions ($f_{1,DG1}(p_0)+f_{2,DG2}(p_0)$).

The target value of the dilution factor may be adjustable and/or selectable. The target value may be user-selectable. The dilution factor may be changed from a first target value ($K_{SET,1}$) to a second target value ($K_{SET,2}$), e.g. by changing parameters of control functions stored in a memory of the control unit REGU1. The apparatus 400 may comprise e.g. an interface for receiving data, for selecting and/or changing the target value. The apparatus 400 may comprise e.g. a user interface for selecting and/or changing the target value. The user interface may comprise e.g. a display, a keypad and/or a touch screen.

The method may comprise adjusting the flow rate ($m'_{DG1}$) of the first dilution gas flow (DG1) according to third control function ($f_{3,DG1}(p_0)$) of the inlet pressure ($p_0$), and adjusting the flow rate ($m'_{DG2}$) of the second dilution gas flow (DG2) according to a fourth control function ($f_{4,DG2}(p_0)$) of the inlet pressure ($p_0$) so as to keep the dilution factor ($K_{20}$) substantially equal to a second selected value ($K_{SET,2}$), wherein the second selected value ($K_{SET,2}$) is different from the first selected value ($K_{SET,1}$).

If needed, the size of the orifices and/or nozzles may be selected and/or changed, to provide a desired dilution factor $K_{20}$.

The flow rate $m'_{DG1}$ of the first diluting unit DU1 may be adjusted based on the inlet pressure $p_0$ and/or the flow rate $m'_{DG2}$ of the ejector unit DU2 may be adjusted according to the inlet pressure $p_0$, so as to keep the total dilution factor $K_{20}$ substantially independent of the inlet pressure $p_0$.

In an embodiment, only the flow rate $m'_{DG2}$ of the ejector unit DU2 may be adjusted according to the inlet pressure $p_0$, wherein the flow rate $m'_{DG1}$ of the first diluting unit DU1 may be kept independent of the inlet pressure $p_0$. In an embodiment, the total dilution factor $K_{20}$ may be kept substantially independent of the inlet pressure $p_0$ also in a situation where the first dilution gas flow is constant, the first dilution gas flow is substantially greater than zero, and only the second dilution gas flow is adjusted according to the inlet pressure $p_0$.

The diluting apparatus 400 may optionally comprise two or more diluting devices connected in series, e.g. in order to provide a higher dilution factor. A diluted aerosol flow provided from the output of a first diluting device may be further diluted by using a second diluting device. At least a part of a diluted output flow of a first diluting device may be guided to the inlet of a second diluting device. At least a part of the output flow of the second diluting device may be guided to an aerosol measuring instrument. The first diluting device and/or the second diluting device may be arranged to operate e.g. as described above with reference to FIGS. 1-7.

The mass flow rates $m'_{DG1}$, $m'_{DG2}$ of the dilution gas flows DG1, and/or DG2 may be adjusted simply by adjusting the upstream pressure $p_G$ of the critical orifices CR1, CR2. Adjusting the upstream pressure $p_G$ according to the inlet pressure $p_0$ may provide a simple, rugged and stable diluting apparatus 400. Heated diluting gas HGAS0 obtained from the heater HEAT1 may be distributed to the diluting units DU1, DU2 via the critical orifices CR1, CR2. Consequently, the apparatus 400 may be implemented also by using a single regulating valve VAL1 and/or by using a single heater HEAT1. The mass flow rates $m'_{DG1}$, $m'_{DG2}$ of the dilution gas flows DG1, and/or DG2 may be accurately adjusted without using a thermal mass flow sensor.

Alternatively, or in addition, the apparatus 400 may comprise one or more thermal mass flow sensors to measure the mass flow rate of the diluting flow or flows DG0, DG1 and/or DG2. In an embodiment, the apparatus 400 may comprise one or more mass flow controllers to adjust the flow rates of the diluting gas flows DG1, DG2. The regulating unit REGU1 of the apparatus 400 may be configured to determine a target mass flow rate value from the measured inlet pressure $p_0$ by using a control function. The regulating unit REGU1 may send a mass flow control signal to the mass flow controller, so as to communicate a target mass flow rate value to the mass flow controller. The mass flow controller may comprise a mass flow sensor, a mass flow control unit, and a mass flow regulating valve. The mass flow controller may adjust the flow rate so as to keep the actual measured mass flow rate substantially equal to the target mass flow rate value. The apparatus 400 may be arranged to adjust the mass flow rate of the diluting gas flow or flows DG0, DG1 and/or DG2 according to the inlet pressure $p_0$, so as to keep the actual dilution factor $K_{20}$ substantially equal to the target dilution factor $K_{SET}$.

FIG. 7 shows, by way of example, method steps for forming the second modified aerosol sample flow from a primary aerosol sample, and for performing an aerosol measurement.

The primary aerosol sample flow FG0 may be obtained in step 805. The primary aerosol sample flow FG0 may be e.g. sampled from an original aerosol PG0, e.g. from a duct DUC1 of an engine SRC1. The primary aerosol sample flow FG0 may be guided to the inlet 101 of the diluting device 100.

The first modified aerosol sample flow FG1 may be formed by using the first diluting gas unit DU1 for combining the primary aerosol sample flow FG0 with the first dilution gas flow DG1 in step 810.

The first modified aerosol sample flow FG1 may be drawn from the first diluting gas unit DU1 by using the ejector unit DU2. The first modified aerosol sample flow FG1 may be drawn from the first diluting gas unit DU1 to the ejector unit DU2 by mixing the first modified aerosol sample flow FG1 with the second diluting gas flow DG2 in the ejector unit DU2 in step 815.

The inlet pressure $p_0$ may be measured in step 820, e.g. by using a pressure sensor M0 to monitor the pressure of the inlet and/or to monitor the pressure of the first distributing space 110.

The flow rate $m'_{DG2}$ of the second dilution gas flow DG2 may be adjusted according to the measured inlet pressure $p_0$ in step 825, so as to keep the total dilution factor substantially independent of the inlet pressure $p_0$. The method may comprise adjusting the both flow rates $m'_{DG1}$, $m'_{DG2}$ of the dilution gas flows DG1, DG2 according to the inlet pressure $p_0$.

The second modified aerosol sample flow FG2 may be provided from the outlet 102 of the ejector unit DU2 in step 830. The second modified aerosol sample flow FG2 may be provided e.g. at the ambient pressure $p_A$. The pressure $p_2$ of the outlet 102 may be kept substantially equal to the ambient pressure $p_A$.

At least a part (e.g. the partial flow FG2A) of the second modified aerosol sample flow FG2 may be guided to an aerosol measuring instrument INSTR1 in step 835. One or more aerosol measurement results RES1(t) may be obtained from the measuring instrument INSTR1 in step 840. One or more aerosol measurement results RES1(t) may be compared with a predetermined limit value in step 845 e.g. in order to determine whether an engine SRC1 or a process complies with an official regulation. One or more aerosol measurement results RES1(t) may be compared with a predetermined limit value in order to determine whether aerosol concentration in a duct DUC1 of a combustion engine SCR1 is smaller than predetermined limit value or not.

The method steps of FIG. 7 may be carried out continuously and simultaneously. The adjusting step 825 may be based on a pressure value obtained in step 820.

By way of example, the dilution factor $K_{10}$ of the first diluting unit DU1 may be e.g. in the range of 1.5 to 5.0, the dilution factor $K_{21}$ of the ejector unit DU2 may be e.g. in the range of 2.0 to 5.0, and the total dilution factor $K_{20}$ of the device 100 may be e.g. in the range of 3.0 to 25 ($=K_{10} \cdot K_{21}$).

By way of example, the (volumetric) flow rate of the primary sample flow FG0 may be e.g. in the range of 3 to 15 slpm, the flow rate of the first modified sample flow FG1 may be e.g. in the range of 15 to 20 slpm, the flow rate of the first diluting gas flow DG1 may be e.g. in the range of 8 to 15 slpm, and the flow rate of second diluting gas flow DG2 may be e.g. in the range of 30 to 75 slpm.

The acronym slpm means standard liters per minute. The density of the aerosol sample FG0 and the density of the diluting gas may be e.g. substantially equal to the density of air. In case of air, the flow rate of one standard liter per minute is equal to the mass flow rate of 1.292 g per minute.

By way of example, the upstream pressure $p_G$ of the critical orifices CR1, CR2 may be e.g. in the range of 2500 to 4500 mbar (absolute pressure).

By way of example, at an operating point of the diluting device 100, the (volumetric) flow rate of the primary sample flow FG0 may be e.g. substantially equal to 5.5 slpm, the flow rate of the first modified sample flow FG1 may be e.g. substantially equal to 19.1 slpm, and the flow rate of the second modified sample flow FG2 may be e.g. substantially equal to 55.4 slpm. The corresponding dilution factor $K_{10}$ of the first diluting unit DU1 may be substantially equal to 3.47 (=19.1 slpm/5.5 slpm), the dilution factor $K_{21}$ of the ejector unit DU2 may be substantially equal to 2.9 (=55.4 slpm/19.1 slpm), and the total dilution factor $K_{20}$ of the device 100 may be substantially equal to 10.07 (=55.4 slpm/5.5 slpm).

For the person skilled in the art, it will be clear that modifications and variations of the devices and the methods according to the aspects of the disclosed embodiments are perceivable. The figures are schematic. The particular embodiments described above with reference to the accompanying drawings are illustrative only and not meant to limit the scope of the present disclosure, which is defined by the appended claims.

The invention claimed is:

1. An aerosol diluting apparatus comprising:
   a first diluting unit to provide a first modified sample flow by combining an aerosol sample flow with a first diluting gas flow,
   a control unit, and
   a control valve,
   wherein the apparatus further comprises an ejector unit to draw the first modified sample flow from the first diluting unit to the ejector unit and to provide a second modified sample flow by mixing a second dilution gas flow with the first modified sample flow, wherein the first diluting unit comprises a gas permeable tunnel element or a nozzle to form a protective annular layer from the first diluting gas flow such that the protective annular layer surrounds a central portion of the first modified sample flow, and wherein the control unit and the control valve are arranged to adjust flow rate of the first dilution gas flow based on a pressure signal indicative of an inlet pressure of the aerosol sample flow and/or to adjust the flow rate of the second dilution gas flow based on the pressure signal indicative of the inlet pressure, such that the dilution factor of the diluting apparatus is kept substantially constant in a situation where the inlet pressure varies, the dilution factor being the ratio of the mass flow rate of the second modified sample flow to the mass flow rate of the aerosol sample flow, wherein the control unit and the control valve are arranged to maintain the flow rate of the second dilution gas flow higher than a predetermined value such that the minimum pressure in the ejector unit during operation is lower than or equal to 500 mbar, so as to ensure a choked flow condition for the first modified aerosol sample flow in the ejector unit.

2. The apparatus of claim 1, comprising a first critical orifice to restrict the first diluting gas flow, and a second critical orifice to restrict the second diluting gas flow, wherein the control unit and the control valve are arranged to adjust an upstream pressure of the critical orifices according to the inlet pressure of the aerosol sample flow.

3. The apparatus of claim 2, wherein the control unit and the control valve are arranged to keep the upstream pressure of the critical orifices higher than or equal to 3000 mbar, so as to ensure a choked flow condition for the first modified aerosol sample flow in the ejector unit.

4. The apparatus according to claim 1, wherein the ejector unit comprises an annular nozzle to guide the second dilution gas flow to a mixing region of the ejector unit.

5. The apparatus according to claim 1, wherein the ejector unit comprises an annular nozzle to guide the second dilution gas flow to a mixing region of the ejector unit, and wherein the annular nozzle of the ejector unit is arranged to operate as a critical orifice to restrict the second diluting gas flow.

6. The apparatus according to claim 1, wherein apparatus is arranged to operate such that the ratio of the flow rate of the first diluting gas flow to the flow rate of the second diluting gas flow is in the range of 0.2 to 3.0.

7. The apparatus according to claim 1, wherein the first diluting unit is arranged to form a protective annular layer from the first diluting gas flow, wherein the first diluting unit comprises an annular nozzle or a gas-permeable element to form a protective layer around a jet of the sample aerosol flow.

8. The apparatus according to claim 1, comprising a heater to provide heated diluting gas.

9. The apparatus according to claim 1, comprising a pressure equalizing unit arranged to maintain an outlet pressure of the ejector unit substantially equal to an ambient pressure.

10. A method, comprising:
using a first diluting unit to provide a first modified sample flow by combining an aerosol sample flow with a first diluting gas flow,
using an ejector unit to draw the first modified sample flow from the first diluting unit to the ejector unit and to provide a second modified sample flow by mixing a second dilution gas flow with the first modified sample flow, and
adjusting flow rate of the first dilution gas flow based on a pressure signal indicative of an inlet pressure of the aerosol sample flow and/or adjusting the flow rate of the second dilution gas flow based on the pressure signal indicative of the inlet pressure, such that the dilution factor of the diluting apparatus is kept substantially constant in a situation where the inlet pressure varies,
the dilution factor being the ratio of the mass flow rate of the second modified sample flow to the mass flow rate of the aerosol sample flow, wherein the first diluting unit comprises a gas permeable tunnel element or a nozzle to form a protective annular layer from the first diluting gas flow such that the protective annular layer surrounds a central portion of the first modified sample flow, wherein the flow rate of the second dilution gas flow is maintained higher than a predetermined value such that the minimum pressure in the ejector unit during operation is lower than or equal to 500 mbar, so as to ensure a choked flow condition for the first modified aerosol sample flow in the ejector unit.

11. The method of claim 10 comprising adjusting the flow rate of the first dilution gas flow according to first function of the inlet pressure, and adjusting the flow rate of the second dilution gas flow according to second function of the inlet pressure so as to keep the dilution factor substantially equal to a first selected value.

12. The method of claim 11 comprising adjusting the flow rate of the first dilution gas flow according to third function of the inlet pressure, and adjusting the flow rate of the second dilution gas flow according to a fourth function of the inlet pressure so as to keep the dilution factor substantially equal to a second different selected value, wherein the second different selected value is different from the first selected value.

13. The method of claim 10 comprising temporarily increasing the ratio of the flow rate of the first diluting gas flow to the flow rate of the second diluting gas flow, so as to protect the units from contamination.

14. The method according to claim 10 comprising obtaining the aerosol sample flow from a duct of a combustion engine or from a duct of a combustion facility.

15. The method according to claim 10 comprising guiding at least a part of the second modified sample flow to an aerosol measuring instrument, and obtaining an aerosol measurement result from the aerosol measuring instrument.

16. The method of claim 15 comprising checking whether the aerosol measurement result complies with a predetermined limit value or not.

* * * * *